(12) United States Patent
Frank

(10) Patent No.: US 8,330,115 B2
(45) Date of Patent: Dec. 11, 2012

(54) HIGH PERFORMANCE NEUTRON DETECTOR WITH NEAR ZERO GAMMA CROSS TALK

(75) Inventor: David L. Frank, Highland Beach, FL (US)

(73) Assignee: Innovative American Technology, Inc., Coconut Creek, FL (US)

( * ) Notice: Subject to any disclaimer, the term of this patent is extended or adjusted under 35 U.S.C. 154(b) by 503 days.

(21) Appl. No.: 12/713,014

(22) Filed: Feb. 25, 2010

(65) Prior Publication Data

US 2010/0294943 A1    Nov. 25, 2010

Related U.S. Application Data

(63) Continuation-in-part of application No. 12/483,066, filed on Jun. 11, 2009, which is a continuation-in-part of application No. 11/624,089, filed on Jan. 17, 2007, now Pat. No. 7,269,527, and a continuation-in-part of application No. 11/852,835, filed on Sep. 10, 2007, now Pat. No. 7,668,681, application No. 12/713,014, which is a continuation-in-part of application No. 11/564,193, filed on Nov. 28, 2006, now Pat. No. 7,851,766, which is a continuation-in-part of application No. 11/291,574, filed on Dec. 1, 2005, now Pat. No. 7,592,601.

(60) Provisional application No. 61/208,492, filed on Feb. 25, 2009, provisional application No. 61/209,194, filed on Mar. 4, 2009, provisional application No. 61/210,075, filed on Mar. 13, 2009, provisional application No. 61/210,122, filed on Mar. 13, 2009, provisional application No. 61/210,234, filed on Mar. 16, 2009, provisional application No. 61/210,238, filed on Mar. 16, 2009, provisional application No. 61/211,629, filed on Apr. 1, 2009, provisional application No. 61/219,111, filed on Jun. 22, 2009, provisional application No. 61/231,805, filed on Aug. 6, 2009, provisional application No. 61/238,819, filed on Sep. 1, 2009, provisional application No. 61/246,299, filed on Sep. 28, 2009, provisional application No. 61/249,408, filed on Oct. 7, 2009, provisional application No. 61/257,964, filed on Nov. 4, 2009, provisional application No. 61/257,968, filed on Nov. 4, 2009, provisional application No. 61/289,163, filed on Dec. 22, 2009, provisional application No. 61/293,974, filed on Jan. 11, 2010, provisional application No. 61/293,993, filed on Jan. 11, 2010, provisional application No. 61/131,639, filed on Jun. 11, 2008.

(51) Int. Cl.
*G01T 3/00* (2006.01)

(52) U.S. Cl. ............... 250/390.01; 250/336.1

(58) Field of Classification Search .......... 250/390, 250/366–369, 336.1, 360.1, 359.1, 390.01, 250/359

See application file for complete search history.

(56) References Cited

U.S. PATENT DOCUMENTS

| | | |
|---|---|---|
| 3,858,728 A | 1/1975 | Fathauer |
| 3,872,287 A | 3/1975 | Koeman |
| 4,029,976 A | 6/1977 | Fish et al. |
| 4,158,773 A | 6/1979 | Novak |
| 4,535,246 A | 8/1985 | Shani |
| 4,799,828 A | 1/1989 | Georgii |
| 5,056,958 A | 10/1991 | Campbell |
| 5,171,986 A | 12/1992 | Loomis et al. |
| 5,241,573 A | 8/1993 | Thacker |
| 5,298,756 A | 3/1994 | McCollum et al. |
| 5,308,986 A | 5/1994 | Walker |
| 5,434,415 A | 7/1995 | Terada et al. |
| 5,471,987 A | 12/1995 | Nakazawa et al. |
| 5,633,508 A | 5/1997 | Schleppenbach |
| 5,638,420 A | 6/1997 | Armistead |
| 5,665,970 A | 9/1997 | Kronenberg et al. |
| 5,703,490 A | 12/1997 | Kennedy |
| 5,838,759 A | 11/1998 | Armistead |
| 5,866,907 A | 2/1999 | Drukier |
| 6,011,266 A | 1/2000 | Bell |
| 6,118,850 A | 9/2000 | Mayo et al. |
| 6,370,222 B1 | 4/2002 | Cornick |

| | | |
|---|---|---|
| 6,407,390 B1 | 6/2002 | Rozsa |
| 6,433,335 B1 | 8/2002 | Kronenberg et al. |
| 6,479,826 B1 | 11/2002 | Klann et al. |
| 6,515,285 B1 | 2/2003 | Marshall et al. |
| 6,545,281 B1 | 4/2003 | McGregor et al. |
| 6,791,089 B1 | 9/2004 | Caffrey et al. |
| 6,845,873 B1 | 1/2005 | Chattey |
| 6,891,470 B2 | 5/2005 | Bohinc |
| 6,897,789 B2 | 5/2005 | Lim |
| 6,937,692 B2 | 8/2005 | Johnson |
| 6,952,652 B2 | 10/2005 | Butters |
| 6,980,483 B2 | 12/2005 | McDonald |
| 6,998,617 B2 | 2/2006 | D'Emilio et al. |
| 7,002,143 B2 | 2/2006 | Parker et al. |
| 7,005,982 B1 | 2/2006 | Frank |
| 7,026,944 B2 | 4/2006 | Alioto et al. |
| 7,030,755 B2 | 4/2006 | Bohinc |
| 7,064,336 B2 | 6/2006 | Archer et al. |
| 7,115,875 B1 | 10/2006 | Worstell |
| 7,116,235 B2 | 10/2006 | Alioto et al. |
| 7,142,109 B1 | 11/2006 | Frank |
| 7,151,447 B1 | 12/2006 | Willms et al. |
| 7,164,138 B2 | 1/2007 | McGregor et al. |
| 7,183,554 B2 | 2/2007 | Gallagher et al. |
| 7,269,527 B1 | 9/2007 | Frank |
| 7,319,717 B2 | 1/2008 | Zitting |
| 7,324,921 B2 | 1/2008 | Sugahara |
| 7,356,115 B2 | 4/2008 | Ford et al. |
| 7,383,142 B2 | 6/2008 | Scoullar et al. |
| 7,391,028 B1 | 6/2008 | Rubenstein |
| 7,411,198 B1 | 8/2008 | Holland et al. |
| 7,414,526 B2 | 8/2008 | Zitting et al. |
| 7,423,273 B2 | 9/2008 | Clayton et al. |
| 7,465,924 B1 | 12/2008 | Klann et al. |
| 7,496,483 B1 | 2/2009 | Pellegrino et al. |
| 7,550,738 B1 | 6/2009 | DeVito |
| 7,592,601 B2 | 9/2009 | Frank |
| 7,609,158 B2 | 10/2009 | Banting et al. |
| 7,677,857 B2 | 3/2010 | Takehara et al. |
| 7,759,649 B2 | 7/2010 | Frank |
| 7,851,766 B2 | 12/2010 | Frank |
| 7,893,557 B2 | 2/2011 | Davis et al. |
| 2002/0175291 A1 | 11/2002 | Reeder et al. |
| 2003/0108150 A1 | 6/2003 | Franke |
| 2003/0144800 A1 | 7/2003 | Davis et al. |
| 2003/0165211 A1 | 9/2003 | Grodzins et al. |
| 2003/0201394 A1 | 10/2003 | Peoples |
| 2004/0018060 A1 | 1/2004 | Knezek et al. |
| 2004/0119591 A1 | 6/2004 | Peeters |
| 2004/0126895 A1 | 7/2004 | Overbeck et al. |
| 2004/0148137 A1 | 7/2004 | Zerwekh et al. |
| 2005/0001728 A1 | 1/2005 | Appelt et al. |
| 2005/0011849 A1 | 1/2005 | Chattey |
| 2005/0023477 A1 | 2/2005 | Archer et al. |
| 2005/0060112 A1 | 3/2005 | Schafer et al. |
| 2005/0082485 A1 | 4/2005 | Torii |
| 2005/0127300 A1 | 6/2005 | Bordynuik |
| 2005/0135535 A1 | 6/2005 | Wallace |
| 2005/0156734 A1 | 7/2005 | Zerwekh et al. |
| 2005/0205793 A1 | 9/2005 | Bohinc |
| 2005/0220247 A1 | 10/2005 | Ruddy et al. |
| 2005/0224719 A1 | 10/2005 | Polichar et al. |
| 2005/0258372 A1 | 11/2005 | McGregor et al. |
| 2005/0275545 A1 | 12/2005 | Alioto et al. |
| 2006/0097171 A1 | 5/2006 | Balchunas et al. |
| 2006/0138331 A1 | 6/2006 | Guillebaud et al. |
| 2006/0141615 A1 | 6/2006 | Lu |
| 2006/0157655 A1 | 7/2006 | Mammone et al. |
| 2006/0284094 A1 | 12/2006 | Inbar |
| 2007/0001123 A1 | 1/2007 | Andrews et al. |
| 2007/0290136 A1 | 12/2007 | Ivan |
| 2008/0023631 A1 | 1/2008 | Majors et al. |
| 2008/0135772 A1 | 6/2008 | Claus et al. |
| 2008/0159416 A1 | 7/2008 | Melick et al. |
| 2009/0014662 A1 | 1/2009 | Suhami |
| 2009/0102680 A1 | 4/2009 | Roos |
| 2010/0226580 A1 | 9/2010 | Frank |

FOREIGN PATENT DOCUMENTS

| | | |
|---|---|---|
| JP | 55050178 A | 4/1980 |
| JP | 58223775 A | 12/1983 |
| JP | 1144768 A | 2/1999 |
| JP | 2008111677 A | 5/2008 |
| KR | 10-1992-7004134 | 12/1992 |
| KR | 200191370 Y1 | 8/2000 |
| KR | 10-1005-0067392 | 7/2005 |
| WO | WO98-00681 | 1/1998 |
| WO | 2004043740 A2 | 5/2004 |
| WO | WO2006-085999 | 8/2006 |
| WO | 2007065004 A2 | 6/2007 |
| WO | 2008118219 A2 | 10/2008 |

OTHER PUBLICATIONS

Mc Gregor, Douglas S., et al, Bulk GaAs-Based Neutron Detectors for Spent Fuel Analysis, Proceedings of ICONE 8, ICONE—8827, 8th Int'l Conf. on Nuclear Engineering, Apr. 2-6, 2000, pp. 1-8, Baltimore, MD.

Klann, Raymond T., et al. Development of Coated Gallium Arsenide Neutron Detectors, Proceedings of ICONE 8, ICONE—8110, 8th Int'l Conf. on Nuclear Engineering, Apr. 2-6, 2000, pp. 1-6, Baltimore, MD.

Mc Gregor, Douglas S., et al., Designs for Thin-Film-Coated Semiconductor Thermal Neutron Detectors, Nov. 14, 2001, pp. 1-5.

Mc Gregor, Douglas S., et al., New Surface Morphology for Low Stress Thin-Film-Coated Thermal Neutron Detectors, IEEE Transactions on Nuclear Science, vol. 49, No. 4, Aug. 2002, pp. 1999-2004.

Mc Gregor, Douglas S., et al., Design considerations for thin film coated semiconductor thermal neutron detectors—I: basics regarding alpha particle emitting neutron reactive films; Nuclear Instruments and Methods in Physics Research A 500 (2003) pp. 272-308.

Shultis, J. Kenneth, et al., Efficiencies of Coated and Perforated Semiconductor Neutron Detectors, IEEE Transactions on Nuclear Science, vol. 53, No. 3, pp. 1659-1665, Jun. 2006.

Mc Neil, W.J., et al., Perforated Diode Fabrication for Neutron Detection, 2006 IEEE Nuclear Science Symposium Conference Record, pp. 3732-3735, Nov. 17, 2006.

Mc Gregor, D.S., et al., Perforated Semiconductor Neutron Detector Modules, 32nd Annual GOMAC Tech Conference, Mar. 19-22, 2007.

Mc Gregor, Douglas S., et al., Perforated Semiconductor Neutron Detector Modules for Detection of Spontaneous Fission Neutrons, IEEE Conference on Technologies for Homeland Security, May 16-17, 2007.

Shultis, Kenneth J. et al., Designs for Micro-Structured Semiconductor Neutron Detectors, Invited Paper, Proc. SPIE 7079, 70790-6 (2008) pp. 6-1: 6-15.

Mc Gregor, D.S., et al., Micro-Structured High-Efficiency Semiconductor Neutron Detectors, 2008 IEEE Nuclear Science Symposium Conference Record, , pp. 446-448, Nov. 12, 2008.

Ugorowski, P., et al., Characterization of the High-Efficiency Neutron Detector Array (HENDA), 2008 IEEE Nuclear Science Symposium Conference Record, pp. 1901-1903.

Unruh, Troy C., et al., Design and operation of a 2-D thin-film semiconductor neutron detector array for use as a beamport monitor, Nuclear Instruments and Methods in Physics Research A 604 (2009) 150-153.

Mc Neil, Walter J., et al., 1-D array of perforated diode neutron detectors, Nuclear Instruments and Methods in Physics Research A 604 (2009) 127-129.

Bellinger, S.L., et al., Characteristics of 3D Micro-Structured Semiconductor High Efficiency Neutron Detectors, IEEE Transactions on Nuclear Science, vol. 56, No. 3, Jun. 2009, pp. 742-746.

Harrison, Mark J., et al., Improved Techniques for the Fabrication of Frisch Collar CdZnTe Gamma Ray Spectrometers, IEEE Transactions on Nuclear Science, vol. 56, No. 3, Jun. 2009, pp. 1671-1676.

Mc Gregor, D.S., et al., Microstructured semiconductor neutron detectors, Nuclear Instruments and Methods in Physics Research A 608 (2009) 125-131.

International Search Report and Written Opinion, PCT/US2009/047084, Jun. 11, 2009.

International Search Report and Written Opinion of the International Searching Authority for PCT/US2010/025429 dated Sep. 28, 2010.
International Search Report and Written Opinion of the International Searching Authority for PCT/US2010/025432 mailed Sep. 28, 2010.
International Preliminary Report & Written Opinion for PCT/US2010/025429, dated Aug. 30, 2011.
International Search Report and Written Opinion of the International Searching Authority for PCT/US2010/025435 mailed Nov. 30, 2010.
Arni Heller: Smart Buoys Help Protect Submarine Base; Jan. Feb. 2004; Lawrence Livermore National Laboratory; pp. 19-22.
Non-Final Office Action for U.S. Appl. No. 12/840,102, mailed Aug. 17, 2011.
Non-Final Office Action for U.S. Appl. No. 12/409,733, mailed Sep. 2, 2011.
Notice of Allowance for U.S. Appl. No. 12/472,707, mailed Sep. 30, 2011.
U.S. Appl. No. 11/291,574, filed Dec. 2005, Frank.
U.S. Appl. No. 11/363,594, filed Feb. 2006, Frank.
U.S. Appl. No. 11/564,193, filed Nov. 2006, Frank.
U.S. Appl. No. 11/931,370, filed Oct. 2007, Frank.
International Preliminary Report on Patentabiilty for PCT/US06/46255 mailed Sep. 24, 2008.
International Search Report and Written Opinion of the International Searching Authority for PCT/US06/46255 mailed Sep. 25, 2007.
Written Opinion of the International Searching Authority for PCT/US07/085578 dated Jan. 23, 2009.
International Search Report for PCT/US07/085578 dated Jan. 23, 2009.
PCT Application No. PCT/US2007/085578 filed Nov. 27, 2007.
PCT Application No. PCT/US2006/46255 filed Nov. 30, 2006.
Non-Final Rejection for U.S. Appl. No. 11/291,574 dated Dec. 2, 2008.
Final Rejection for U.S. Appl. No. 11/291,574 dated Mar. 20, 2008.
Notice of Allowance for U.S. Appl. No. 11/291,574 dated May 20, 2009.
Non-Final Rejection for U.S. Appl. No. 11/363,594 dated Aug. 23, 2006.
Notice of Allowance for U.S. Appl. No. 11/363,594 dated Sep. 27, 2006.
Non-Final Rejection for U.S. Appl. No. 11/564,183 dated Jun. 25, 2009.
Non-Final Rejection for U.S. Appl. No. 11/931,370 dated Dec. 12, 2008.
Final Rejection for U.S. Appl. No. 11/931,370 dated Sep. 9, 2009.
Final Rejection for U.S. Appl. No. 11/564,193 dated Jan. 8, 2010.
Notice of Allowance for U.S. Appl. No. 11/930,229 dated Apr. 7, 2010.
International Search Report and Written Opinion for PCT/US09/050299 dated Mar. 3, 2010.
Notice of Allowance for U.S. Appl. No. 11/931,370 dated Mar. 30, 2010.
International Search Report for PCT/US09/038064 dated Jul. 31, 2009.
International Search Report and Written Opinion for PCT/US09/044486 dated Dec. 23, 2009.
International Search Report and Written Opinion for PCT/US09/044475 dated Jan. 6, 2010.
International Search Report and Written Opinion for PCT/US09/045268 dated Jan. 29, 2010.
International Search Report and Written Opinion for PCT/US09/044494 dated Jan. 18, 2010.
Speller, R., "Radiation Based Security", 2001, Radiation Physics and Chemistry, vol. 61, pp. 293-300.
Non-Final Office Action dated Mar. 22, 2012 received for U.S. Appl. No. 12/468,382.
Non-Final Office Action dated Jun. 8, 2012 received for U.S. Appl. No. 11/928,299.
Non-Final Office Action dated Jun. 21, 2012 received for U.S. Appl. No. 12/501,220.
Non-Final Office Action dated Jul. 5, 2012 received for U.S. Appl. No. 12/698,598.
Non-Final Office Action dated Mar. 9, 2012 received for U.S. Appl. No. 12/409,758.
Non-Final Office Action dated Aug. 7, 2012 received for U.S. Appl. No. 11/624,121.
Tian et al., "Comparison of statistical pattern-recognition algorithms for hybrid processing. I. Linear-mapping algorithms", J. Opt. Soc. Am. A, vol. 5, No. 10, pp. 1655-1669, Oct. 1988.
Jastaniah et al., "Digital pulse shape algorithms for scintillation-based neutron detectors," 2001, IEEE Nuclear Science Symposium Conference Record, vol. 2, Nov. 2001, pp. 816-821.
Intersil Corporation EL2030 Data sheet, www.intersil.com, 2003, 12 pages.
Non-Final Office Action dated Mar. 9, 2012 received for U.S. Appl. No. 12/483,066.
Final Office Action dated Aug. 30, 2012 received for U.S. Appl. No. 12/483,066.

*Primary Examiner* — Edwyn Labaze

(74) *Attorney, Agent, or Firm* — Fleit Gibbons Gutman Bongini & Bianco PL; Jose Gutman

(57) ABSTRACT

A scintillator system is provided to detect the presence of fissile material and radioactive material. One or more neutron detectors include scintillator material, and are optically coupled to one or more wavelength shifting fiber optic light guide media that extend from the scintillator material to guide light from the scintillator material to a photosensor. An electrical output of the photosensor is connected to an input of a pre-amp circuit designed to provide an optimum pulse shape for each of neutron pulses and gamma pulses in the detector signals. Scintillator material as neutron detector elements can be spatially distributed with interposed moderator material. Individual neutron detectors can be spatially distributed with interposed moderator material. Detectors and moderators can be arranged in a V-shape or a corrugated configuration.

14 Claims, 17 Drawing Sheets

HIGH PERFORMANCE NEUTRON DETECTOR WITH NEAR ZERO GAMMA CROSS TALK

CROSS-REFERENCE TO RELATED APPLICATIONS

This application claims priority from prior provisional application 61/208,492 filed on Feb. 25, 2009. This application claims priority from prior provisional application 61/209,194 filed on Mar. 4, 2009. This application claims priority from prior provisional application 61/210,075 filed on Mar. 13, 2009. This application claims priority from prior provisional application 61/210,122 filed on Mar. 13, 2009. This application claims priority from prior provisional application 61/210,234 filed on Mar. 16, 2009. This application claims priority from prior provisional application 61/210,238 filed on Mar. 16, 2009. This application claims priority from prior provisional application 61/211,629 filed on Apr. 1, 2009. This application claims priority from prior provisional application 61/219,111 filed on Jun. 22, 2009. This application claims priority from prior provisional application 61/231,805 filed on Aug. 6, 2009. This application claims priority from prior provisional application 61/238,819 filed on Sep. 1, 2009. This application claims priority from prior provisional application 61/246,299 filed on Sep. 28, 2009. This application claims priority from prior provisional application 61/249,408 filed on Oct. 7, 2009. This application claims priority from prior provisional application 61/257,964 filed on Nov. 4, 2009. This application claims priority from prior provisional application 61/257,968 filed on Nov. 4, 2009. This application claims priority from prior provisional application 61/289,163 filed on Dec. 22, 2009. This application claims priority from prior provisional application 61/293,974 filed on Jan. 11, 2010. This application claims priority from prior provisional application 61/293,993 filed on Jan. 11, 2010. This application is a Continuation-in-part of application Ser. No. 12/483,066 filed on Jun. 11, 2009 and application Ser. No. 12/483,066 which claims priority from prior provisional application 61/131,639 filed on Jun. 11, 2008 and application Ser. No. 12/483,066 which is a continuation-in-part of application Ser No. 11/624,089 filed on Jan. 17, 2007 and application Ser. No. 12/483,066 which is a continuation-in-part of application Ser. No. 11/852,835 filed on Sep. 10, 2007. This application is continuation-in-part of application Ser. No. 11/564,193 filed on Nov. 28, 2006 and application Ser. No. 11/564,193 which is continuation-in-part of application Ser. No. 11/291,574 filed on Dec. 1, 2005. The entire collective teachings thereof being herein incorporated by reference.

FIELD OF THE INVENTION

The present invention generally relates to the field of gamma and neutron detection systems, and more particularly relates to high efficiency neutron detection with low gamma cross talk.

BACKGROUND OF THE INVENTION

The accepted standard in neutron detection has been based on helium-3 (He3). One problem with conventional neutron detectors based on helium-3 is that helium-3 is a natural resource with a very limited supply. These types of detectors and all other known neutron detectors have a gamma rejection of approximately up to 4 gamma pulses in 10,000 pulses detected. Unfortunately, these levels of gamma rejection in conventional neutron detectors can result in too many false positive alarms, indicating that a neutron particle has been detected when in reality a gamma particle was detected. Gamma particles can occur from natural phenomena, such as from the sun, while neutron particles typically indicate a presence of radioactive and/or fissile material. Accurate detection of the occurrence of the neutron particles, without false detection of gamma particles as neutron particles, is critical for monitoring border activities such as during homeland defense and security.

The need for an efficient neutron detector, with little to no false positive alarms due to gamma cross-talk, is critical in many applications such as for homeland security, medical applications, and military applications.

Neutron detectors that are not based on helium-3, generally use lithium 6 or boron 10 dissolved uniformly into a plastic or glass scintillator. One problem with these types of detectors is that they produce much less light per neutron collision event and require much more gain in a photomultiplier tube (PMT). These types of devices also have increased gamma ray sensitivity and use analog techniques to separate gamma from neutron collision events, which typically result in gamma pulse rejection rates of 4 in ten thousand, leaving an unsatisfactory rate of gamma false positives.

An example of a lithium 6 (6Li) neutron detector is described in U.S. Pat. No. 7,244,947 "Neutron detector with layered thermal-neutron scintillator and dual function light guide and thermalizing media" filed on Apr. 13, 2004 by Polichar and Baltgalvis and issued on Jul. 17, 2007. They describe a broad spectrum neutron detector with a thermal neutron sensitive scintillator film interleaved with a hydrogenous thermalizing media. In the Polichar invention, lithium 6 material is combined with Zns (Ag) material and a hydrogenous binder to form a thermalizing neutron detector layer. The neutrons collide with the scintillation layer to create light that is transported to a photosensor. Moderator materials applied between the neutron detector layers thermalize the neutrons. The phosphor and fiber optics both act as efficient gamma detectors.

The 6LiZns(Ag) neutron detector described in U.S. Pat. No. 7,244,947 is described in detail in a Bicron Corporation and the Los Alamos National Laboratory (LANL) report published and released to the public in 2002: "Prototype Neutron-Capture Counter for Fast-Coincidence Assay of Plutonium in Residues". The Bicron/LANL team described the use of 6LiZnS(Ag) mixture in a hydrogenous binder (moderator material) for each detector layer. Both Polichar and the Bicron/LANL team acknowledge gamma interference that occurs with this type of detector and their need to find a method to separate the neutron and gamma signals.

Analog pulse shape differentiation was discussed as a possible means to address the gamma interference. However, the analog pulse shape differentiation methods available were technically insufficient to correct the gamma interference. The neutron detection efficiencies, per layer, and the gamma interference rates described in the Polichar invention and the Bicron/LANL team report require significant improvements to become a viable product that can compete with conventional neutron detector technologies such as the 3He neutron detector. In addition, the use of moderator material within the 6LiZnS(Ag) detector mixture or between the 6LiAnS(Ag) detector layers causes a loss of thermal neutrons due to absorption by the moderator material reducing the number of available thermal neutrons for detection.

Furthermore, a thesis was published by Mr. Thomas McKnight describing the 6LiZnS(Ag) multi-layer detector using a hydrogenous binder. Again, the neutron detection efficiencies, per layer, and the gamma interference rates described in the McKnight thesis require significant improvements to become a viable product that can compete with conventional neutron detector technologies such as the 3He neutron detector. The McKnight design also uses moderator material within the 6LiZnS(Ag) detector mixture reducing the number of thermal neutrons available for detection due to absorption by the thermalizing moderator material. Analog pulse shape differentiation is discussed as a possible means to address the gamma interference. However, the analog pulse shape differentiation methods available were insufficient to correct the gamma interference.

Current attempts at the detection of special nuclear materials such as highly enriched uranium have had difficulties with the low number of neutrons and the ability to shield low gamma energy that are generated from these materials. Those gamma detectors that can identify highly enriched uranium rely on low energy gamma below 200 Key, which can be easily shielded. Therefore, conventional detectors do not adequately detect special nuclear materials.

SUMMARY OF THE INVENTION

In one embodiment, a neutron detector system is disclosed. The detector system, according to this embodiment, includes one or more neutron detector elements, based on Li6 or 6LiF or Li3 mixed in a binder medium comprising a first scintillator material, and optically coupled to one or more first wavelength shifting fiber optic light guide media. A tapered portion of the one or more first wavelength shifting fiber optic light guide media extend from at least one end of the first scintillator material to guide light from the first scintillator material to at least one first photosensor at the tapered portion. An electrical output of the first photosensor is connected to an input of a first pre-amp circuit designed to operate close to the decay time of the first scintillator material.

The detector system, according to one embodiment, can also include one or more gamma detectors based on second scintillator material, that are optically coupled to one or more second wavelength shifting fiber optic light guide media, and have a tapered portion of the second wavelength shifting fiber optic light guide media extending from at least one end of the second scintillator material to guide light from the second scintillator material to a second photosensor at the tapered portion. An electrical output of the second photosensor is connected to an input of a second pre-amp circuit designed to operate close to the decay time of the second scintillator material.

According to another embodiment, a scintillator detector system comprises an information processing system and at least one neutron and/or gamma detector coupled with the information processing system. The at least one detector comprises a plurality of scintillator layers comprising 6LiF or Li6 or Li3 and one or more phosphor materials mixed in a binder medium. A photosensor is electrically coupled to a sensor circuit. At least one light guide medium optically couples the plurality of scintillator layers to the photosensor for coupling light photons emitted from neutron particles colliding and interacting with scintillator material in the plurality of scintillator layers into the at least one light guide medium and thereby to the photosensor. The sensor circuit has an electrical signal input electrically coupled to an electrical signal output from the photosensor. A moderator material is disposed externally surrounding the plurality of scintillator layers, and without moderator material being interposed between any two of the plurality of scintillator layers of the at least one neutron and/or gamma detector.

In one embodiment, moderator material is placed in between a plurality of layers of the scintillator material and with a first outer layer of the scintillator material remaining unmoderated by the moderator material, thereby enabling a thermal neutron detector and a fast neutron detector of progressively moderated neutrons.

According to one embodiment, a thermal neutron detector comprises one or more layers of 6LiF mixed in a binder medium with a scintillator material, that are optically coupled to one or more fiber optic light guide media. These optical fibers have a tapered portion extending from one or both ends of said layers to guide the light to a narrowed section. The narrowed section is coupled to a photosensor. A photosensor is coupled to a pre-amp circuit designed to drive the detector signal processing rate close to the decay time of the scintillator material. This enables pulses to be delivered without distortion to a set of electronics that performs analog to digital conversion.

Firmware or software processes the signals to apply digital gamma pulse differentiation for elimination or separation (or filtering) of gamma signal interference from neutron detection.

In another embodiment, the moderator material for the thermal neutron detector system is designed around the thermal neutron detector, and moderator material is not used within the mixture of each detector layer or between detector layers. This structure provides a designed level of moderator interaction with the neutrons before they are introduced to the thermal neutron detector comprising one or more detector layers. Each of the thermal neutron detector layers has an efficiency level for the detection of thermal neutrons. The multiple layers act to increase the detector efficiency. The elimination of moderator materials within the detector layers and/or between the detector layers reduces neutron absorption and increases the number of thermal neutrons available for detection.

In another embodiment, the moderator materials are designed and applied within the thermal neutron detector system to enable the differential detection of fast neutrons and thermal neutrons. The thermal neutron detector when exposed without moderator material is a simple thermal neutron detector. A thermal neutron detector surrounded by moderator material can be designed to detect fast neutrons within a thermal energy range due to the density and thickness of the moderator selected.

In another embodiment, the moderator material can be designed to enable the thermal neutron detector to detect fast neutrons thermalized to a specific energy range. Multiple layers of moderator and thermal neutron detectors can be arranged to detect different stages of thermalized neutrons providing energy information on the neutrons detected at each layer.

According to one embodiment, staggered multiple layers of optical fiber strands and detector materials can be sandwiched together, where a first set of parallel fiber strands in a first fiber layer are disposed on top of the middle detector material layer and which is disposed on top of a second set of parallel fiber strands in a second fiber layer. The first set of parallel fiber strands is arranged in a staggered orientation relative to the second set of parallel fiber strands. By staggering the two sets of parallel fiber layers by a portion of the diameter of a fiber (such as by one half of the diameter of a fiber), it locates the sandwiched parallel fibers closer together (with the detector material in between) and thereby more likely to couple light photons into the fibers when neutrons interact with the detection materials.

A moderator material is designed to surround the thermal neutron detector. An optimum moderator design is applied to slow the fast neutrons to a thermal energy to enable the best efficiency for thermal neutron detection. An example of the moderator design is a two inch thick HPGE moderator material, or even a larger thickness.

A protective covering is applied to the detector to eliminate light intrusion into the detector area. Thermistors may be applied to monitor the operating temperature of the detector components to enable automated or manual calibration of the detector output signals.

A light shield is applied to the outer shell of the detector layers to eliminate outside light interference by using an opaque shrink wrap as a light shield around the detector area up to and or covering a portion of the photosensor. Another method for light shielding could be an opaque covering applied as a liquid that dries onto the detector and acts as a light shield around the detector area up to and/or covering a portion of the photosensor.

According to one embodiment, an array of the neutron detectors is deployed in a gamma and/or neutron detector system for the inspection of shipping containers.

In another embodiment, one or more neutron detectors are spatially distributed between moderator material. Optionally, scintillator material in a neutron detector can comprise a plurality of scintillation layers that are spatially distributed between moderator material.

According to another embodiment, a solid state photomultiplier is located adjacent to, and optically coupled with, a scintillation detector layer. The binder material can be selected to be clear and translucent, allowing more light transmission. The light emitted from the detector layer is directly detected by the solid state photomultiplier, which then delivers electrical signal to an amplifier circuit and thereby to a digital signal processing circuit. This configuration of a detector system advantageously eliminates using wavelength shifting optical fibers to guide light out of the scintillation detector layer, which reduces manufacturing cost and simplifies the manufacturing process for the detector.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Neutron Detector System

Figure 1:
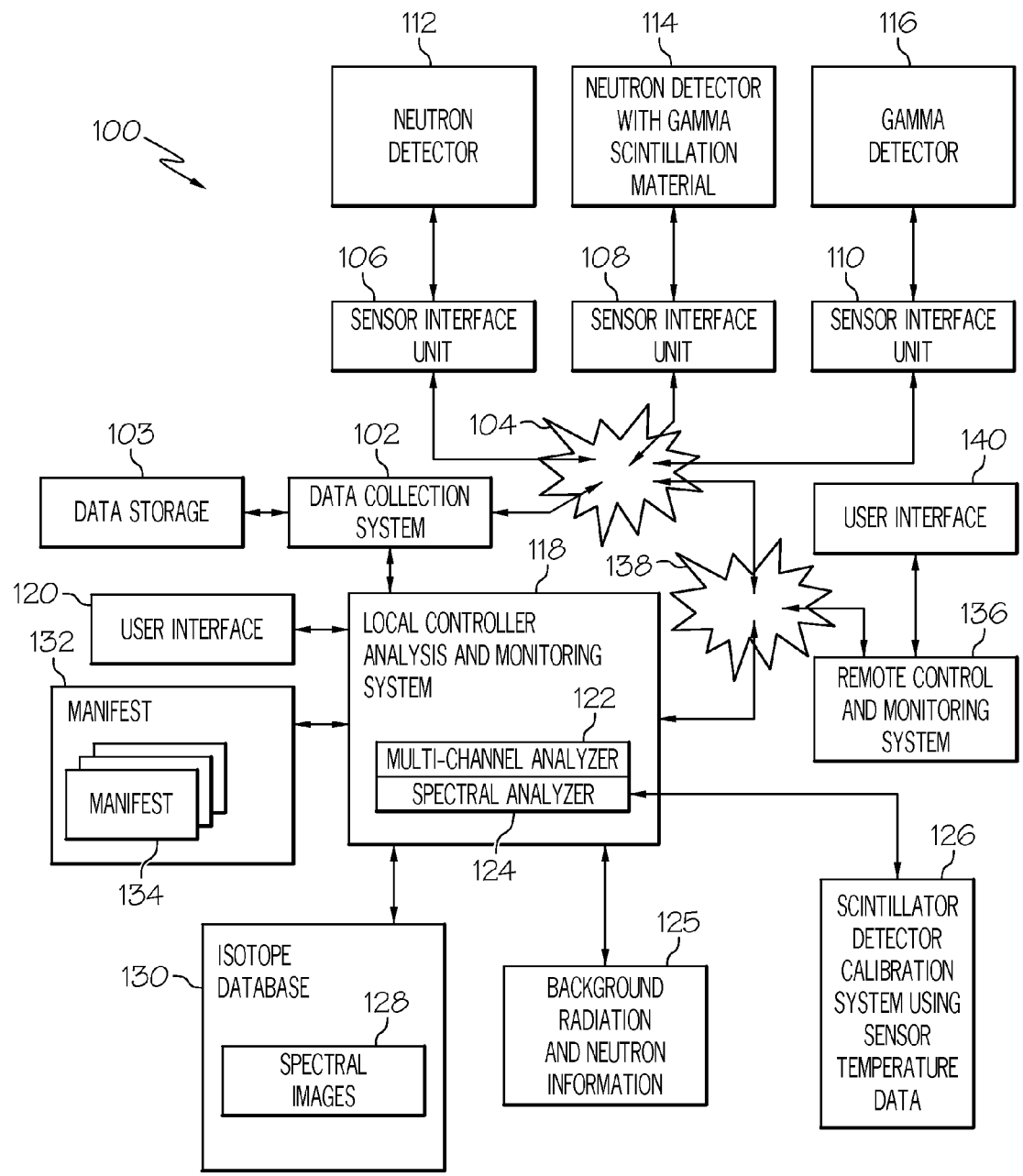
FIG. 1 is a block diagram illustrating an example of a system according to one embodiment of the present invention.

FIG. 1 is a block diagram illustrating one example of a neutron detector system 100 according to one embodiment of the present invention. In particular, FIG. 1 shows that a data collection system 102 is communicatively coupled via cabling, wireless communication link, and/or other communication links 104 with one or more high speed sensor interface units (SIU) 106, 108, 110. The high speed sensor interface units 106, 108, 110 each support one or more high speed scintillation (or scintillator) detectors, which in one embodiment comprise a neutron detector 112, a neutron detector with gamma scintillation material 114, and a gamma detector 116. Each of the one or more SIUs 106, 108, 110 performs analog to digital conversion of the signals received from the high speed scintillation detectors 112, 114, 116. An SIU 106, 108, 110 performs digital pulse discrimination based on one or more of the following: pulse height, pulse rise-time, pulse fall-time, pulse-width, pulse peak, and pulse pile-up filter.

The data collection system 110, in one embodiment, includes an information processing system (not shown) comprising data communication interfaces (not shown) for interfacing with each of the one or more SIUs 124. The data collection system 110 is also communicatively coupled to a data storage unit 103 for storing the data received from the SIUs 106, 108, 110. The data communication interfaces collect signals from each of the one or more high speed scintillation detectors such as the neutron pulse device(s) 112, 114 and the gamma detector 116. The collected signals, in this example, represent detailed spectral data from each sensor device 112, 114, 116 that has detected radiation. In one embodiment, the SIU(s) 124 can discriminate between gamma pulses and neutron pulses in a neutron detector 112. The gamma pulses can be counted or discarded. Also, the SIU(s) 106, 108, 110 can discriminate between gamma pulses and neutron pulses in a neutron detector with gamma scintillation 114. The gamma pulses can be counted, processed for spectral information, or discarded.

The data collection system 102, in one embodiment, is modular in design and can be used specifically for radiation detection and identification, or for data collection for explosives and special materials detection and identification. The data collection system 102 is communicatively coupled with a local controller and monitor system 118. The local system 118 comprises an information processing system (not shown) that includes a computer system(s), memory, storage, and a user interface 120 such a display on a monitor and/or a keyboard, and/or other user input/output devices. In this embodiment, the local system 118 also includes a multi-channel analyzer 122 and a spectral analyzer 124.

The multi-channel analyzer (MCA) 122 can be deployed in the one or more SIUs 106, 108, 110 or as a separate unit 122 and comprises a device (not shown) composed of many single channel analyzers (SCA). The single channel analyzer interrogates analog signals received from the individual radiation detectors 112, 114, 116 and determines whether the specific energy range of the received signal is equal to the range identified by the single channel. If the energy received is within the SCA, the SCA counter is updated. Over time, the SCA counts are accumulated. At a specific time interval, a multi-channel analyzer 122 includes a number of SCA counts, which result in the creation of a histogram. The histogram represents the spectral image of the radiation that is present. The MCA 122, according to one example, uses analog to digital converters combined with computer memory that is equivalent to thousands of SCAs and counters and is dramatically more powerful and less expensive than deploying the same or even a lesser number of SCAs.

A scintillation calibration system 126 uses temperature references from a scintillation crystal to operate calibration measures for each of the one or more high speed scintillation detectors 112, 114, 116. These calibration measures can be adjustments to the voltage supplied to the high speed scintillation detector, adjustments to the high speed scintillation detector analog interface, and or software adjustments to the spectral data from the high speed scintillation detector 112, 114, 116. For example, high speed scintillator detector 112, 114, 116, can utilize a temperature sensor in contact with the scintillation crystal and/or both in the photosensor of the detector to determine the specific operating temperature of the crystal. The specific operating temperature can be used as a reference to calibrate the high speed scintillation detector. The detector crystal and the photosensor both may have impacts on detector signal calibration from changing temperatures. A temperature chamber can be used to track the calibration changes of an individual detector, photosensor or mated pair across a range of temperatures. The calibration characteristics are then mapped and used as a reference against temperatures experienced in operation.

Histograms representing spectral images 128 are used by the spectral analysis system 124 to identify fissile materials or isotopes that are present in an area and/or object being monitored. One of the functions performed by the local controller 118 is spectral analysis, via the spectral analyzer 124, to identify the one or more isotopes, explosives, or special materials contained in a container under examination. In one embodiment, background radiation is gathered to enable background radiation subtraction. Background neutron activity is also gathered to enable background neutron subtraction. This can be performed using static background acquisition techniques and dynamic background acquisition techniques. Background subtraction is performed because there are gamma and neutron energies all around. These normally occurring gamma and neutrons can interfere with the detection of the presence of (and identifying) isotopes and nuclear materials. In addition, there can be additional materials other than the target giving off gammas and or neutrons. Therefore, the background gamma and neutron rate is identified and a subtraction of this background is performed to allow for an effective detection and identification of small amounts of radiation of nuclear material. This background and neutron information 125 is then passed to the local control analysis and monitoring system 118 so that precise and accurate monitoring can be performed without being hindered by background radiation. The dynamic background analysis technique used to perform background subtraction enables the neutron detector system 100 to operate at approximately four sigma producing an accuracy of detection above background noise of 99.999%.

After background subtraction, with respect to radiation detection, the spectral analyzer 124 compares one or more spectral images of the radiation present to known isotopes that are represented by one or more spectral images 128 stored in the isotope database 130. By capturing multiple variations of spectral data for each isotope there are numerous images that can be compared to one or more spectral images of the radiation present. The isotope database 130 holds the one or more spectral images 128 of each isotope to be identified. These multiple spectral images represent various levels of acquisition of spectral radiation data so isotopes can be compared and identified using various amounts of spectral data available from the one or more sensors. Whether there are small amounts (or large amounts) of data acquired from the sensor, the spectral analysis system 124 compares the acquired radiation data from the sensor to one or more spectral images for each isotope to be identified. This significantly enhances the reliability and efficiency of matching acquired spectral image data from the sensor to spectral image data of each possible isotope to be identified.

Once one or more possible isotopes are determined to be present in the radiation detected by the sensor(s) 112, 114, 116, the local controller 118 can compare the isotope mix against possible materials, goods, and/or products that may be present in the container under examination. Additionally, a manifest database 132 includes a detailed description (e.g., manifests 134) of the contents of a container that is to be examined. The manifest 134 can be referred to by the local controller 118 to determine whether the possible materials, goods, and/or products, contained in the container match the expected authorized materials, goods, and/or products, described in the manifest for the particular container under examination. This matching process, according to one embodiment of the present invention, is significantly more efficient and reliable than any container contents monitoring process in the past.

The spectral analysis system 124, according to one embodiment, includes an information processing system (not shown) and software that analyzes the data collected and identifies the isotopes that are present. The spectral analysis software is able to utilize more than one method to provide multi-confirmation of the isotopes identified. Should more than one isotope be present, the system 124 identifies the ratio of each isotope present. There are many industry examples of methods that can be used for spectral analysis for fissile material detection and isotope identification.

The data collection system 102 can also be communicatively coupled with a remote control and monitoring system 136 via at least one network 138. The remote system 136 comprises at least one information processing system (not shown) that has a computer, memory, storage, and a user interface 140 such as a display on a monitor and a keyboard, or other user input/output device. The networks 104, 138 can be the same networks, comprise any number of local area networks and/or wide area networks. The networks 104, 138 can include wired and/or wireless communication networks. The user interface 140 allows remotely located service or supervisory personnel to operate the local system 118; to monitor the status of shipping container verification by the collection of sensor units 106, 108, 110 deployed on the frame structure; and perform the operations/functions discussed above from a remote location.

Neutron Detector

The following is a more detailed discussion of a neutron detector such as the neutron detector 112 or 114 of FIG. 1. The neutron detector of various embodiments of the present invention provides high levels of efficiency with near zero gamma cross talk. The neutron detector is a high efficiency neutron detector that uses a scintillator medium coupled with fiber optic light guides with high speed analog to digital conversion and digital electronics providing digital pulse shape discrimination for near zero gamma cross talk.

The neutron detector of various embodiments of the present invention is important to a wide variety of applications: such as portal detectors, e.g., devices in which a person or object is passed through for neutron and gamma detection, fissile material location devices, neutron based imaging systems, hand held, mobile and fixed deployments for neutron detectors. The neutron detector in various embodiments of the present invention, for example, can utilize the Systems Integration Module for CBRNE sensors discussed in the commonly owned U.S. Pat. No. 7,269,527, which is incorporated by reference herein in its entirety.

Figure 2:
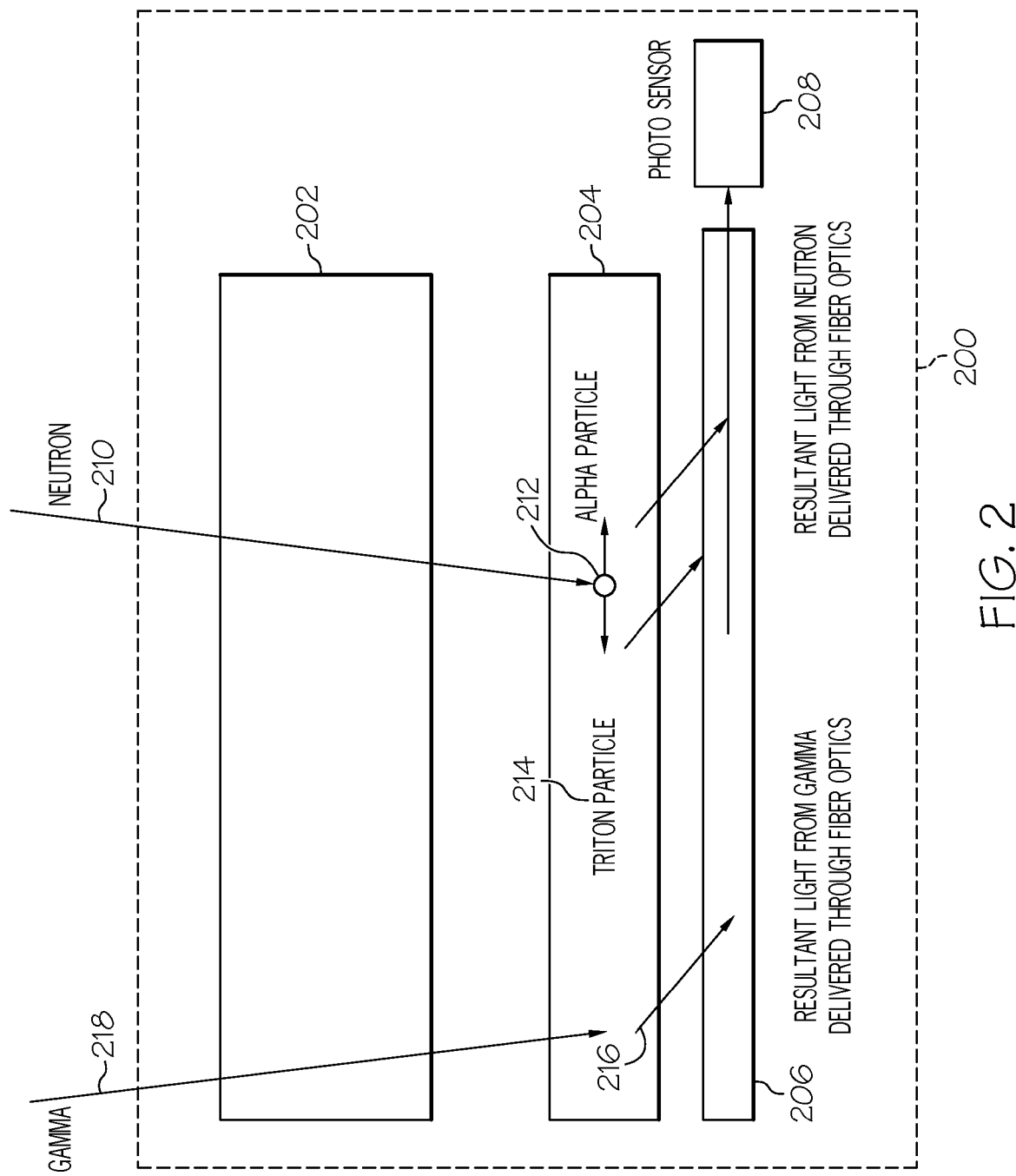
FIG. 2 is block diagram of a gamma and neutron detector according to one embodiment of the present invention.

FIG. 2 is a block diagram illustrating a more detailed view of a neutron detector 200 according to one embodiment of the present. In particular, FIG. 2 shows that the neutron detector 200, in this example, comprises a neutron moderator material 202 such as polyethylene. The neutron detector 200 also comprises scintillation material that can comprise, in this example, Li6ZnSAg material, Li3PO4 material, or a material including 6Li or 6LiF, or any similar substance. In one embodiment, 6LiF material is mixed in a hydrogenous binder medium with a scintillation (or scintillator) material 204 and has a thickness of about (but not limited to) 0.1 mm to about 0.5 mm. The scintillator material 204, in one embodiment, can comprise one or more materials such as (but not limited to) ZnS, ZnS(Ag), or NaI(Tl). One or more of these materials give the neutron detector 200 resolution for gamma signals that can be used in spectroscope analysis.

The moderator material 202 acts as a protective layer that does not allow light into the detector 200. Alternatively, a separate light shield can be applied to the outer shell of the detector layers to eliminate outside light interference. Also, the moderator material 202 can comprise interposing plastic layers that act as wavelength shifters. According to one embodiment, at least one plastic layer is adjacent to (and optionally contacting) at least one light transmissive medium and/or light guide medium. According to one embodiment, the at least one light transmissive medium and/or light guide medium at the at least one scintillator layer is substantially surrounded by plastic that acts as a wavelength shifter. That is, the plastic layers (and/or optionally plastic substantially surrounding the light guide medium at the at least one scintillator layer) act(s) as wavelength shifter(s) that receive light photons emitted from the at least one scintillator layer (from neutron particles interacting with the at least one scintillator layer) and couple these photons into the at least one light transmissive medium and/or light guide medium. According to one embodiment, the at least one light guide medium at the at least one scintillator layer comprises fiber optic media that acts as a wavelength shifter (e.g., wave shifting fiber). This provides a more efficient means of collecting light out the end of the at least one light guide medium, such as when the light enters from substantially normal incidence from the outside of the at least one light guide medium.

An example of a moderator material that can be used with various embodiments of the present invention comprises dense polyethylene. The optimum moderator configuration, in one embodiment, is estimated at approximately 2 inches of dense polyethylene. Moderator of at least 0.25 inches up to 3.0 inches deep can be used effectively in various embodiments of the present invention. The moderator material 202 thermalizes the fast neutrons before they enter the detector 200. This thermalization of the fast neutrons allows the thermal neutron detector to perform at an optimum efficiency. Thermal neutron sensitive scintillator material that is useful in the fabrication of a neutron detector such as the detector 200 of FIG. 2 includes, but is not limited to 6Li—ZnS, 10BN, and other thin layers of materials that release high energy He or H particles in neutron capture reactions. Such materials can be 6Li- or 10B-enriched ZnS, 10BN, or other phosphors that contain Li or B as an additive. Examples of such scintillator plastics include BC 480, BC 482, and BC 484, all available from the French company St. Gobain, SA.

The neutron detector 200, according to one embodiment, comprises a light guide medium 206 such as one or more optical fibers that are coupled to a photosensor 208. The photosensor 508, in one embodiment, comprises at least one of a photomultiplier tube, an avalanche photo diode, and a phototransistor. The 6Li or 6LiF and scintillator material 204 is optically coupled to the light guide medium 206. The light guide medium 206, in one embodiment, includes a tapered portion that extends from one or both ends of the scintillation layer 204 to guide the light to a narrowed section. This narrowed section is optically coupled to the photosensor 208 at the tapered portion. The photosensor, such as the photomultiplier tube, is tuned to operate close to the light frequency of the light photons generated from the scintillation material and carried by the light guide medium.

The scintillation material 204 is excited by an incident neutron 210 that is slowed (thermalized) by the moderator material 202. The scintillation material reacts 204 with the thermalized neutron particle by emitting an alpha particle 212 and a triton particle 214 into the neighboring scintillation material 204, which can be, in this example, a phosphor material. The scintillation material 204 is energized by this interaction and releases the energy as photons (light) 216. The photons 216 travel into the light carrying medium 206 and are guided to the ends of the medium 206 and exit into the photosensor 208. In one embodiment, the light guide medium 206 is a wavelength shifter. The wavelength shifter shifts blue or UV light to a wavelength that matches the sensitivity of a photosensor 208, avalanche sensor, or diode sensor. It should be noted that a gamma particle 218 can also hit the scintillation material 204, which creates photons 216 that are received by the photosensor 208.

The neutron detector 200 provides significant improvements in form and function over a helium-3 neutron detector. The neutron detector 200 is able to be shaped into a desired form. For example, the scintillator layer(s) and moderator material can be curved and configured for up to a 360 degree effective detection angle of incidence. The at least one scintillator layer and moderator material can be flat and designed as a detector panel. The neutron detector 200 comprises a uniform efficiency across the detector area. The neutron detector 200 can comprise multiple layers to create an efficiency that is substantially close to 100%.

Figure 3:
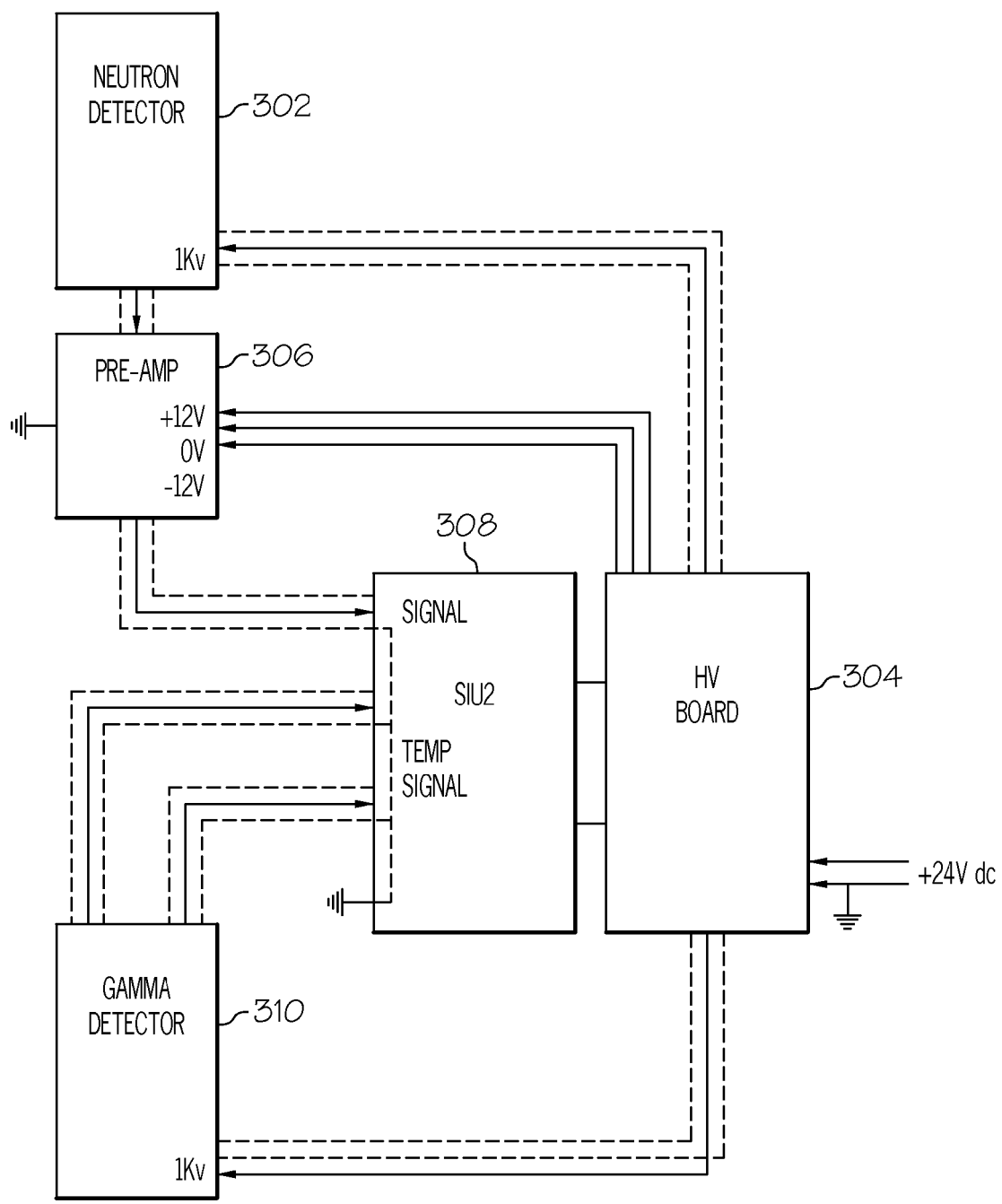
FIG. 3 is a schematic illustrating a neutron detector and its supporting components according to one embodiment of the present invention.

FIG. 3 is a schematic that illustrates various components that are used to support a neutron detector such as the neutron detectors 112, 114 shown in FIG. 1. In one embodiment, the various electrical components shown in FIG. 3 provide a signal sampling rate of 50 million samples per second or faster. In particular, FIG. 3 shows a neutron detector 302 electrically coupled to a high voltage board 304, which provides power to the neutron detector 302. The neutron detector 302 generates analog signals that are received by a pre-amp component 306, which is also electrically coupled to the high voltage board 304. The pre-amp 306, in one embodiment, drives the detector signal processing rate close to the decay time of the scintillator material in the detector 302. This enables pulses to be delivered without distortion to a set of electronics that perform analog to digital conversion, such as the SIU 308. The SIU 308 is electrically coupled to the pre-amp 306, high voltage board 304, and a gamma detector 310 (in this embodiment). The analog signals from the neutron detector 302 are processed by the pre-amp 306 and sent to the SIU unit 308. The SIU 308 performs an analog-to-digital conversion process on the neutron detector signals received from the pre-amp 306 and also performs additional processing, which has been discussed above.

Figure 4:
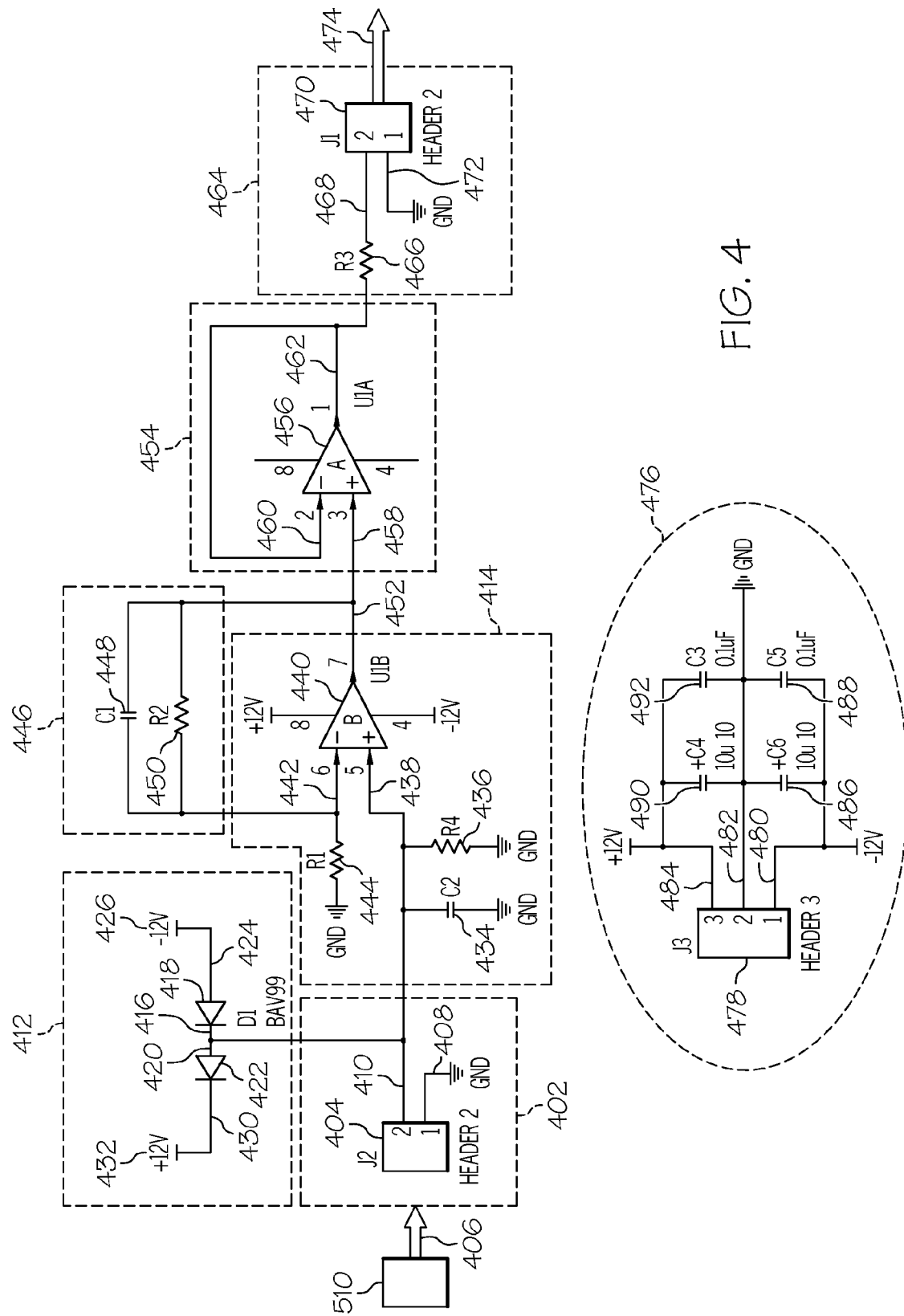
FIG. 4 is a circuit diagram for a pre-amp according to one embodiment of the present invention.

FIG. 4 shows a more detailed schematic of the pre-amp component 306. The pre-amp component 306 shown in FIGS. 3 and 4 is enhanced to reduce the pulse stretching and distortion typically occurring with commercial preamps. The pre-amp 306 of FIGS. 3 and 4 removes any decay time constant introduced by capacitive and or inductive effects on the amplifier circuit. For example, the impedance, in one embodiment, is lowered on the input of the preamp that is attached to the output of a photomultiplier tube 510, 512, 514, 516 (FIG. 5) to maintain the integrity of the pulse shape and with the preamp output signal gain raised to strengthen the signal.

The pre-amp circuit 306 of FIG. 4 includes a first node 402 comprising a header block 404 that is electrically coupled to the output 406 of the neutron detector photomultiplier 510 as shown in FIG. 4. A first output 408 of the header block 404 is electrically coupled to ground, while a second output 410 of the header block 404 is electrically coupled a second node 412 and a third node 414. In particular, the second output 410 of the header block 404 is electrically coupled to an output 416 of a first diode 418 in the second node 412 and an input 420 of a second diode 422. The input 424 of the first diode 418 is electrically coupled to a voltage source 426. The output of the first diode is electrically coupled to the input of the second diode. The output 440 of the second diode 422 is electrically coupled to a second voltage source 442.

The third node 414 comprises a capacitor 444 electrically coupled to ground and a resistor 436 that is also electrically coupled to ground. The capacitor 444 and the resistor 436 are electrically coupled to the second output 410 of the header block 406 and to a first input 438 of an amplifier 440. A second input 442 of the amplifier 440 is electrically coupled to a resistor 444 to ground. The amplifier 440 is also electrically coupled to a power source as well. A fourth node 446 is electrically coupled to the second input 442 of the amplifier in the third node 414. The fourth node 446 includes a capacitor 448 and a resistor 450 electrically coupled in parallel, where each of the capacitor 448 and resistor 450 is electrically coupled to the second input 442 of the amplifier 440 in the third node 414 and the output 452 of the amplifier 440 in the third node 414.

The output 452 of the amplifier 440 in the third node 414 is electrically coupled to a fifth node 454 comprising another amplifier 456. In particular, the output 452 of the amplifier 440 of the third node 414 is electrically coupled to a first input 458 of the amplifier 456 in the fifth node 454. A second output 460 of the amplifier 456 in the fifth node 454 is electrically coupled to the output 462 of the amplifier 456. The output 462 of the amplifier 456 is electrically coupled to a sixth node 464. In particular, the output 462 of the amplifier 456 in the fifth node 454 is electrically coupled to a resistor 466 in the sixth node 464, which is electrically coupled to a first input 468 of another header block 470. A second input 472 of the header block 470 is electrically coupled to ground. An output 474 of the header block 470 is electrically coupled to an analog-to-digital converter such as an SIU discussed above.

The pre-amp circuit 306 of FIG. 4 also includes a seventh node 476 comprising a header block 478. A first 480 and third 484 output of the third header block 478 is electrically coupled to a respective voltage source. A second output 482 is electrically coupled to ground. The first output 480 is electrically coupled to a first 486 and second 488 capacitor, which are electrically coupled to the second output 482. The third output 484 is electrically coupled to a third 490 and a fourth 492 capacitor, that are electrically coupled to the second output 482 as well.

Figure 5:
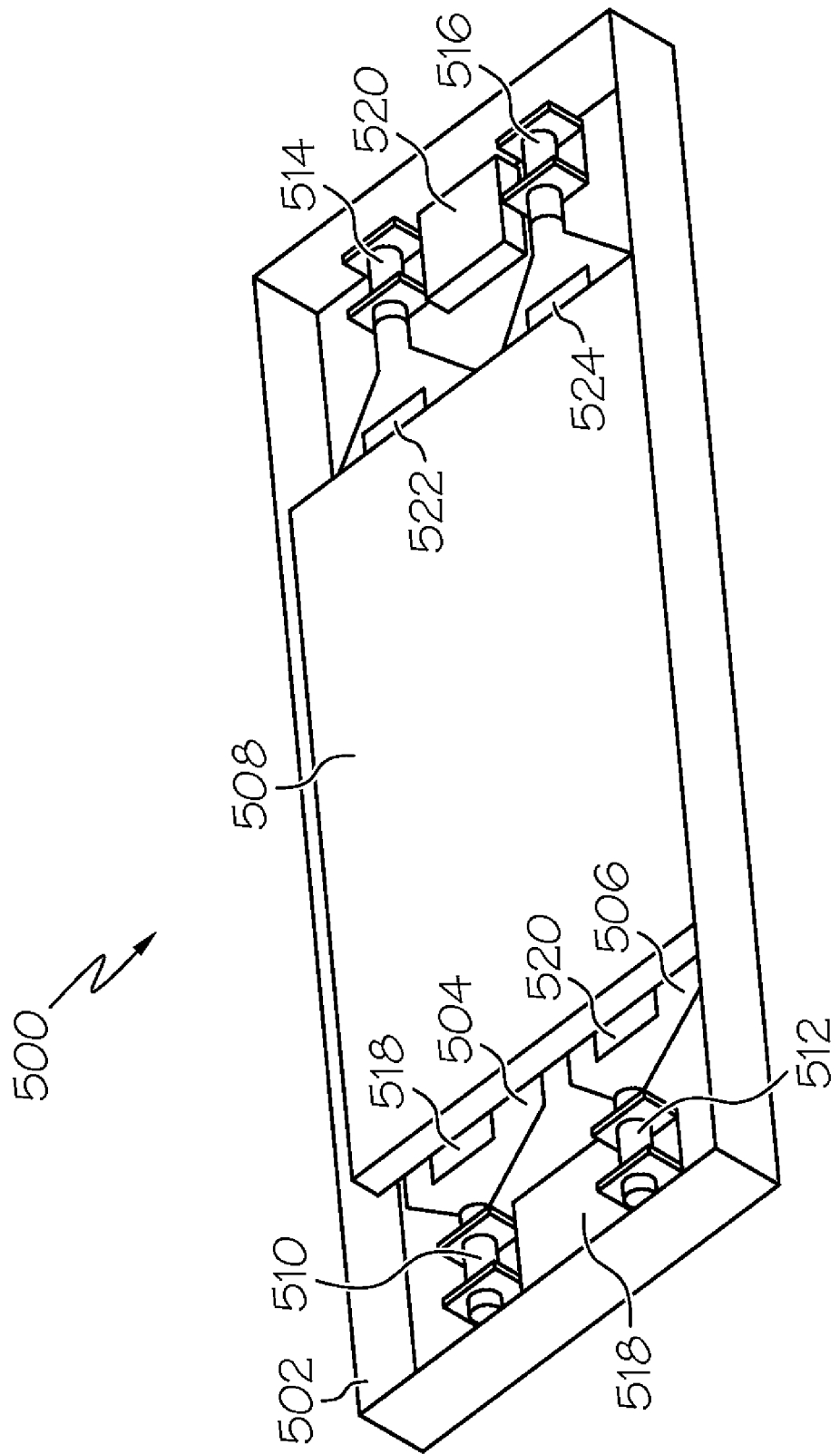
FIG. 5 is top-planar view of a neutron detector according to one embodiment of the present invention.

FIG. 5 shows a top planar cross-sectional view of a neutron detector component 500 that can be implemented in the system of FIG. 1. In particular, FIG. 5 shows a housing 502 comprising one or more thermal neutron detectors 504, 506. The thermal neutron detector 504, 506, in this embodiment, is wrapped in a moderator material 508. Photomultiplier tubes 510, 512, 514, 516 are situated on the outer ends of the thermal neutron detectors 504, 506. Each of the photomultiplier tubes 510, 512, 515, 516 is coupled to a preamp 518, 520, 542, 544. Each preamp 518, 520, 522, 524 is electrically coupled to a sensor interface unit 556, 528. Each preamp 518 can be electrically coupled to its own SIU 526, 528 or to an SIU 526, 528 that is common to another preamp 520, as shown in FIG. 5.

The thermal neutron detector 504, 506 is wrapped in a moderator material 508 comprising moderator efficiencies that present a greater number of thermalized neutrons to the detector 504, 506 as compared to conventional neutron detectors. A neutron moderator is a medium that reduces the speed of fast neutrons, thereby turning fast neutrons into thermal neutrons that are capable of sustaining a nuclear chain reaction involving, for example, uranium-235. Commonly used moderators include regular (light) water (currently used in about 75% of the world's nuclear reactors), solid graphite (currently used in about 20% of nuclear reactors), and heavy water (currently used in about 5% of reactors). Beryllium has also been used in some experimental types, and hydrocarbons have been suggested as another possibility.

The following is a non-exhaustive list of moderator materials that are applicable to one or more embodiments of the present invention. Hydrogen, as in ordinary water ("light water"), in light water reactors. The reactors require enriched uranium to operate. There are also proposals to use the compound formed by the chemical reaction of metallic uranium and hydrogen (uranium hydride—$UH_3$) as a combination fuel and moderator in a new type of reactor. Hydrogen is also used in the form of cryogenic liquid methane and sometimes liquid hydrogen as a cold neutron source in some research reactors: yielding a Maxwell-Boltzmann distribution for the neutrons whose maximum is shifted to much lower energies. Deuterium, in the form of heavy water, in heavy water reactors, e.g. CANDU. Reactors moderated with heavy water can use unenriched natural uranium. Carbon, in the form of reactor-grade graphite or pyrolytic carbon, used in e.g. RBMK and pebble-bed reactors, or in compounds, e.g. carbon dioxide. Lower-temperature reactors are susceptible to buildup of Wigner energy in the material. Like deuterium-moderated reactors, some of these reactors can use unenriched natural uranium. Graphite is also deliberately allowed to be heated to around 2000 K or higher in some research reactors to produce a hot neutron source: giving a Maxwell-Boltzmann distribution whose maximum is spread out to generate higher energy neutrons. Beryllium, in the form of metal, is typically expensive and toxic, and so its use is limited. Lithium-7, in the form of a fluoride salt, typically in conjunction with beryllium fluoride salt (FLiBe) is the most common type of moderator in a Molten Salt Reactor. Other light-nuclei materials are unsuitable for various reasons. Helium is a gas and is not possible to achieve its sufficient density, lithium-6 and boron absorb neutrons.

In addition to the neutron detector configuration shown in FIG. 5, a multi-layered neutron detector can also be used in one or more embodiments of the present invention. In this embodiment a full neutron detector is constructed with moderator material and multiple layers of the neutron detector device. A second full neutron detector with moderator material is positioned directly behind the first to create a multilayered neutron detector system. In another embodiment, moderator materials are interleaved between one or more of the detector layers. Additional moderator materials may be applied surrounding this detector configuration.

Also, one or more embodiments of the present invention can be utilized as a passive neutron detection system for shielded nuclear materials such as highly enriched uranium. In this embodiment, the neutron detector discussed above provides strong detection capabilities for shielded nuclear material. Additional detector configurations may be added to increase the shielded nuclear materials detection capability. The thermal neutron detector system 100 may also add one or more fast neutron detectors designed as a high performance detector with modified preamp and connection to the sensor interface unit for high speed digital data analysis. The sandwich neutron detector design discussed above can be used to increase the detection capability of shielded nuclear materials. A more efficient moderator material may be developed to increase the number of fast neutrons that are thermalized and presented to the neutron detector. Also, the neutron detector of the various embodiments of the present invention can use moderator materials for a portion of the detector surface area to enable detection of thermal neutrons and to convert fast neutrons to thermal neutrons.

Experimental Information

Based on the processing speeds and features of the proprietary sensor interface unit (SIU) 106, 108, 100, (which is commercially available from Innovative American Technologies, Inc.) experiments were performed with gamma/neutron pulse differentiation techniques. The various embodiments of the present invention were able to effectively eliminate the gamma detections without impacting the neutron detection efficiencies. After extensive testing, it was found that the conventional multichannel analyzers and detector electronics in the industry with primarily applied features on the analog side of the electronics ran at slower speeds than the neutron detector pulse. The pulses were subsequently altered (slowed down) to address the slower MCA electronics. Slowing the pulse distorts the shape of the pulse, which causes problems in differentiating between gamma and neutron pulses. Also, when the electronics extend the pulse, an opportunity is created for pulse stacking to occur, where the overall envelope is larger than that of a single neutron pulse, rendering the pulse shape analysis unreliable at best.

Therefore, the neutron pre-amp 306 (FIG. 3) according to one or more embodiments of the present invention is enhanced to reduce the pulse stretching and distortion typically occurring with commercial pre-amps. That is, the pre-amp circuit is configured to operate substantially close to a decay time of the scintillator layer when interacting with neutrons, and without adding further extension (distortion) to the electrical signal output from the pre-amp. The pre-amp 306 removes decay time constant that may be introduced by capacitive and or inductive effects on the amplifier circuit. For example, the impedance can be lowered on the input of the pre-amp attached to the output from the photomultiplier tube to maintain the integrity of the pulse shape, and optionally with the pre-amp output gain raised to strengthen the output signal.

The neutron detector 200 improves the gamma discrimination by utilizing the preamp 306 to keep the pulse as close as possible to its original duration and shape with a pulse duration of approximately 250 nanoseconds (in one embodiment). This improves linearity and increases the ability to process more counts per second, especially in a random burst where multiple gamma and/or neutron pulse events may be blurred into one pulse. The programmable gain and offset of the SIU 106, 108, 110 analog front end presents the pulse signal to a 50 MHz high speed/high resolution digitizer which feeds the Field programmable Gate Array (FPGA) that includes proprietary hardware real-time Pulse DSP programmable filters from Innovative American Technology (IAT), Inc. The high speed analog-to-digital conversion circuit (within the Sills) can plot the fastest pulse with approximately 15 points of high resolution data. These programmable filters are used in the second stage of signal processing to eliminate noise and most gamma pulses via a LLD (low level discriminator) or noise canceller as well as employing a pulse rise time filter. Pulses must meet a minimum rise time to be considered for analysis. The next stage of signal processing occurs at a pulse width filter, which measures the duration of the pulse at a point where the shape widens when the pulse originates from a neutron reaction. Gamma pulses have a clean and rapid decay, whereas neutron interaction with the detector produces an extended fall time.

The result of the above signal processing is that the speed of the SIU 106, 108, 110 system hardware and embedded processor clearly differentiates between a neutron pulse and a gamma pulse. This enables the neutron detector system 100 to eliminate nearly 100% of the gamma pulses received by the neutron detector without impacting the neutron detector efficiencies. Subsequent testing at various laboratories supported zero gamma detection (zero gamma cross-talk) under high gamma count rates and high gamma energy levels. For example, testing with Cs 137 in the inventor's lab (16 microcuries) placed directly in front of the neutron detector, using the IAT commercially available SIU and RTIS application components, provided the following results: 1/10,000,000 (one in ten million) gamma pulse counts using Cs137 for the test. The neutron detector 200 was deployed using the IAT detection, background subtraction and spectral analysis system software operating at 4.2649 sigma which translates to a false positive rate of 1/100,000 (one in one hundred thousand) or an accuracy rate of 99.999%.

An Example of a Discrimination Process

Figure 6:
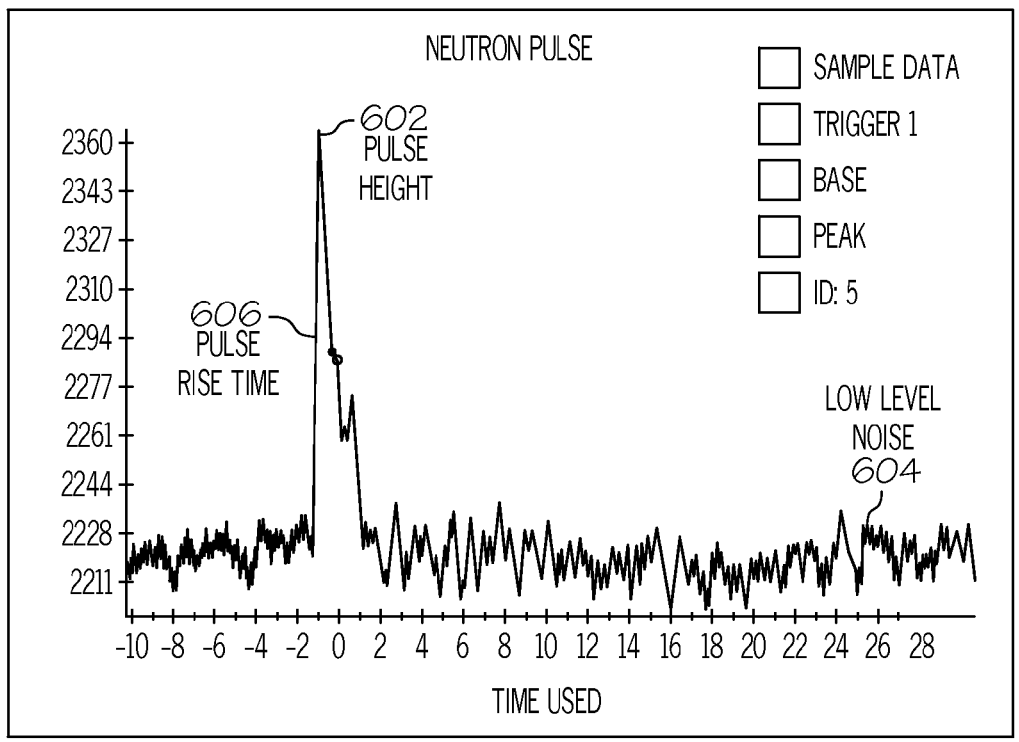
FIG. 6 is a graph illustrating a neutron pulse generated from a neutron detector according to one embodiment of the present invention.
Figure 7:
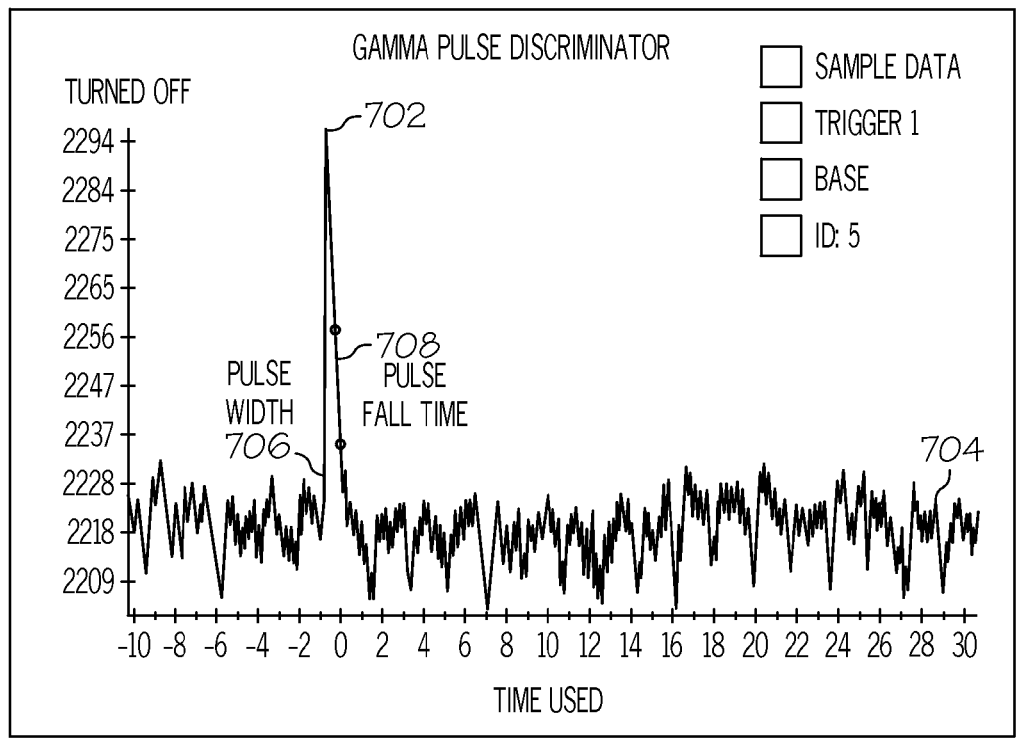
FIG. 7 is a graph illustrating a gamma pulse generated from a neutron detector according to one embodiment of the present invention.

FIGS. 6 and 7 show a neutron pulse and a separate gamma pulse, respectively, generated from the neutron detector 200 and digitally converted for processing. The neutron pulse in FIG. 6 represents a pure pulse without distortion, meets the pulse height 602 requirements, is above the noise threshold filter 604, meets the pulse rise-time requirements 604, and has a much wider base than the example gamma pulse in FIG. 7, accordingly identifying the pulse as a neutron pulse. The gamma pulse in FIG. 7, meets the pulse height requirement, is above the noise threshold filter, does not meet the pulse rise width 702 requirement, and is therefore eliminated through pulse shape discrimination (which comprise discrimination by any one or more of the following signal features: pulse height, pulse width, pulse rise time, and/or pulse fall time).

Therefore, the neutron detector 200 provides various improvements over conventional helium-e type detectors. For example, with respect to the neutron detector 200, the pulse height allows the detector system 100 to provide better discrimination against lower energy gamma. The Li+n reaction in the neutron detector 200 produces 4.78 Mev pulse. The He3+n reaction only produces 0.764 Mev pulse. With respect to wall effects, the neutron detector 200 is thin so a very small fraction of the gamma energy is absorbed making very small gamma pulses. Pile up of pulses can produce a larger apparent pulse. However this is avoided with the fast electronics. The walls of the He3 detectors capture some energy, which broadens the pulse. Thus, such implementation typically uses large size tubes. With a broad neutron pulse fast electronics cannot be used to discriminate against gamma pulses during pile up without cutting out some of the neutron pulse energy.

With respect to pulse width, the neutron pulse width is narrower in the neutron detector 200 than in He3 detectors. This makes the use of fast electronics more beneficial. With respect to, thermal neutron efficiency He3 is very efficient 90% at 0.025 eV neutrons. However He3 efficiency drops off rapidly to 4% for 100 ev neutrons. Because He3 is a gas a large volume detector is needed to get this efficiency. He3 efficiency coupled with a moderator assembly is estimated at between 30% down to 1% across the energy range and depends on He3 volume. The neutron detector 200 is a solid material, and smaller volumes can be used. Multiple layers of the neutron detector 200 raise the overall detector system efficiency. In one embodiment of the present invention, a four layer configuration of the neutron detector 200 was constructed that reached efficiencies of close to 100%. The neutron detector 200 efficiency coupled with the moderator assembly is estimated at 30% across the energy range.

The neutron detector 200 is advantageous over conventional helium-3 neutron detectors for the following reasons. The neutron detector can be shaped into any desired form. The neutron detector comprises uniform efficiency across the detector area. Also, multiple layers of the detector can create an efficiency which is close to 100%.

Detection of Shielded HEU (Passively)

The neutron detector 200, in one embodiment, is an effective passive detector of specialized nuclear materials. The most difficult to detect is typically highly enriched uranium (HEU). More difficult is shielded highly enriched uranium. The HEU detection capabilities were analyzed and the conclusions are discussed below. The useful radioactive emissions for passively detecting shielded HEU are neutron and gamma rays at 1 MeV from decay of U-238. The neutrons offer the best detection option. The gamma rays with energy below 200 KeV are practical for detecting only unshielded HEU since these are too easily attenuated with shielding. The most effective detection solutions will place detectors with the largest possible area and most energy-specificity within five meters and for as long a time as possible since: (a.) at distances of 10 meters or more, the solid angle subtended by the detector (~detector area/distance2) from a 50 kg HEU source is likely to reduce the signal as much as any reasonable size shielding, and (b) with sufficient time for the detector to detect neutron counts and photon counts within a narrow enough photon energy range, even signals below the background can be detected.

In one model applicable to one or more embodiments of the present invention, it is assumed that the HEU core is shielded externally by lead. The linear attenuation coefficient, defined as the probability per unit distance that a gamma ray is scattered by a material, is a function of both the material and the energy of the gamma ray. Steel and concrete have linear attenuation coefficients at 1 MeV that are not all that different from lead, so the conclusions will be roughly similar even with other typical shielding materials. In addition to the external shield, the mass of HEU itself acts to shield gamma rays (self-shielding). The number of neutrons and gamma rays that reach the detector is limited by the solid angle subtended by the detector from the source. Finally, detection involves reading enough counts of neutrons and gamma rays to be able to ascertain a significant deviation from the background and the detector only detects a fraction of those neutron and gamma rays that are emitted due to detection inefficiencies. Each of these factors when put together forms a "link budget" and is explained below.

Nuclear theory is used to estimate the maximum distance possible for passive detection of a lead-shielded HEU spherical core using both U-238 and U-232 signals. The distance compared against variables of interest including detector area, detection time, shield thickness, and mass of the HEU core. Detection distance depends on amount of HEU and its surface area, shielding, detector area, distance, and time available to detect the emissions. Maximum detection distance is dependent on these factors. The neutron emissions and the neutron detector 200 are used, in this example, to enable neutron detection to four counts above background noise levels. The low number neutron counts and the low number 1 MeV gamma counts are used to identify the source as a high probability of shielded HEU.

Neutron Emissions of U-238, U-235, and U-234

The neutron "link budget" is not easily amenable to analytical approximation as it is for gammas. For a comparison with gammas, the basics of neutron emissions and attenuation are presented here in the specific case of weapons grade Uranium (WgU). Weapons grade Uranium (WgU) emits neutrons at the rate of roughly 1/s/kg with an energy distribution centered around 1 MeV—primarily due to spontaneous fission of Uranium isotopes, with each of 234, 235, and 238 contributing roughly equal numbers of neutrons given their relative composition in WgU. These energetic neutrons also have mean free path lengths of 2-6 cm in most shielding materials (tungsten, lead, etc.) whereas 1 MeV gammas are only ~1 cm by comparison. A 24 kg WgU sample with tungsten tamper emits 60 neutrons per second in addition to 60 1 MeV gamma rays per second at the surface of the sample. The path loss through free space is equivalent for both forms of radiation. Although neutrons may pass through shielding further than 1 MeV gammas, the difference is small enough that detection of shielded HEU using neutrons and the identification of shielded HEU through the combined detection of low counts for both neutrons and 1 MeV gamma is viable.

Gamma Emissions of U-238, U-235, and U-232

Uranium consists of multiple isotopes. By definition highly enriched Uranium (HEU) has more than 20% 13 of the isotope U-235 which is fissile, and weapons grade Uranium contains over 90% 14 U-235. Radioactive decay of U-235 results in gamma rays at 185 KeV, but shielding too easily attenuates these and so they are not useful for detecting shielded HEU. HEU also contains the isotope U-238—the more highly enriched, the less the percentage of U-238. A conservative assumption for detection using U-238 emissions is that HEU or weapons grade Uranium contains at least 5% U-238 by weight. U-232 may also be present in trace quantities (parts per trillion).

U-238 emits 81 gammas per second per gram at 1.001 MeV. This number can also be derived using first principles and nuclear data, but results in only a slightly higher value based on data from U-232's decay chain produces even more penetrating gamma rays than U-238. The most important gamma emitter in the U-232 decay chain is Tl-208, which emits a 2.6 MeV gamma ray when it decays. These gamma rays can be effectively used to detect the presence of HEU if U-232 is known to be a contaminant, even to the effect of a few hundred parts per trillion. Embodiments of the present invention can similarly arrive at the rates for U-232, the most penetrating of which has emissions at 2.614 MeV at a rate of $2.68 \times 10^{11}$ gammas per gram per second.

In an analysis of the neutron detector system 100 it was determined that the ability to create a large neutron detector surface area with enhanced performance through modifications to the conventional preamp, use of digital electronics described in the sensor interface unit, advanced background subtraction methods and advanced spectral analysis methods, the system 100 was able to detect and identify special nuclear materials such as highly enriched uranium and shielded highly enriched uranium at quantities below 24 kilograms through a combination of neutron and gamma detections.

The passive scintillation detector system discussed above can be configured to detect and identify shielded highly enriched uranium based on low neutron counts coupled with low 1 MeV gamma counts. The system detects and identifies highly enriched uranium based on low level neutron counts coupled with low gamma counts at 1 MeV or greater energies coupled with gamma ray energy associated with HUE that are below 200 KeV.

The passive scintillation detector system discussed above can also be configured as a horizontal portal, a truck or bomb cart chassis, a spreader bar of a gantry crane, a straddle carrier, a rubber tired gantry crane, a rail mounted gantry crane, container movement equipment, a truck, a car, a boat, a helicopter, a plane or any other obvious position for the inspection and verification of persons, vehicles, or cargo. The system can be configured for military operations or military vehicles, and for personal detector systems. The system can also be configured for surveillance and detection in protection of metropolitan areas, buildings, military operations, critical infrastructure such as airports, train stations, subway systems or deployed on a mobile platform such as a boat, a vehicle, a plane, an unmanned vehicle or a remote control vehicle.

Information Processing System

Figure 8:
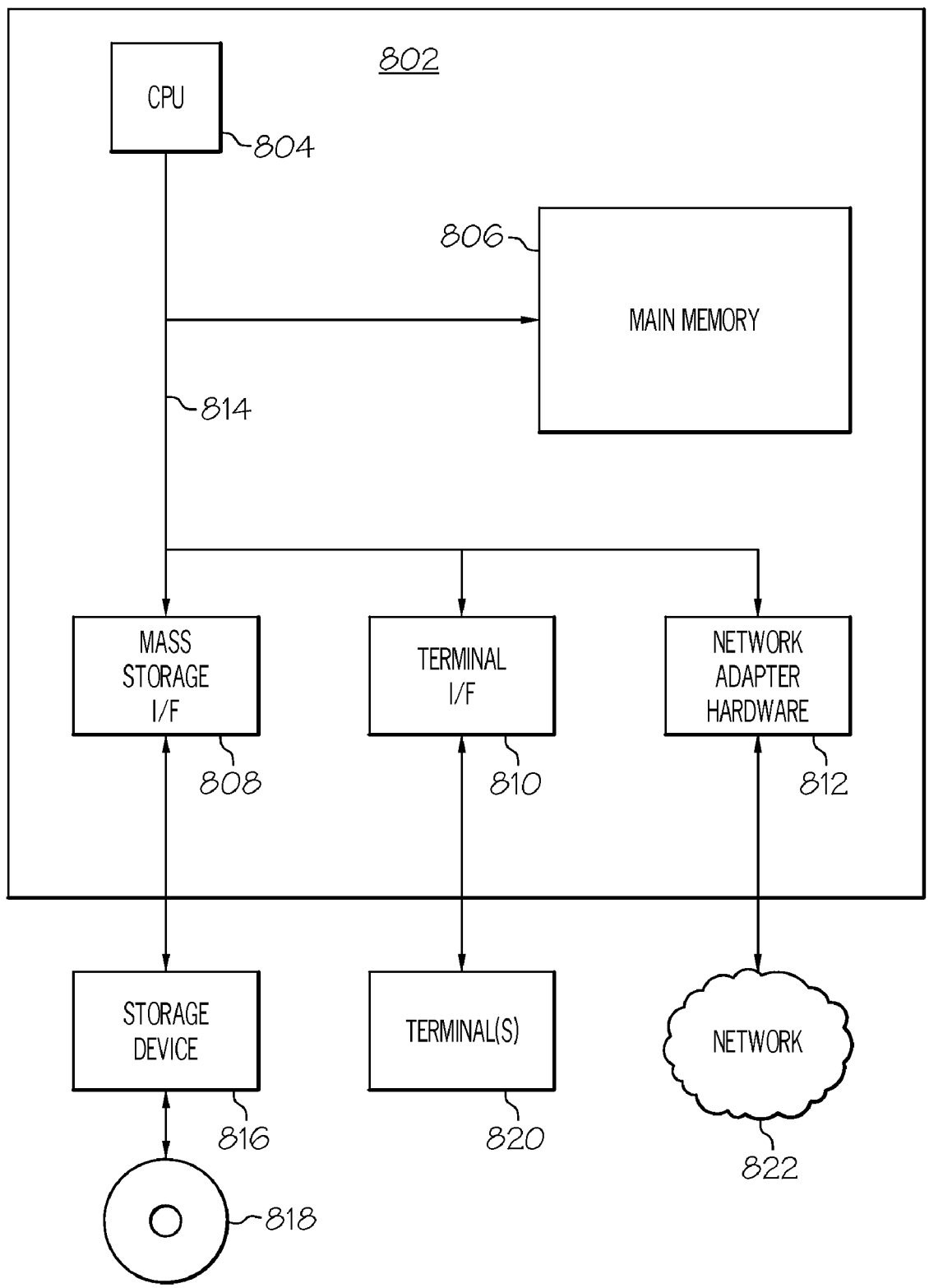
FIG. 8 is a block diagram illustrating a detailed view of an information processing system according to one embodiment of the present invention.

FIG. 8 is a block diagram illustrating a more detailed view of an information processing system 800 according to one embodiment of the present invention. The information processing system 800 is based upon a suitably configured processing system adapted to be implemented in the neutron detection system 100 of FIG. 1. Any suitably configured processing system is similarly able to be used as the information processing system 800 by embodiments of the present invention such as an information processing system residing in the computing environment of FIG. 1, a personal computer, workstation, or the like.

The information processing system 800 includes a computer 802. The computer 802 has a processor(s) 804 that is connected to a main memory 806, mass storage interface 808, terminal interface 810, and network adapter hardware 812. A system bus 814 interconnects these system components. The mass storage interface 808 is used to connect mass storage devices, such as data storage device 816, to the information processing system 800. One specific type of data storage device is an optical drive such as a CD/DVD drive, which may be used to store data to and read data from a computer readable medium or storage product such as (but not limited to) a CD/DVD 818. Another type of data storage device is a data storage device configured to support, for example, NTFS type file system operations.

In one embodiment, the information processing system 800 utilizes conventional virtual addressing mechanisms to allow programs to behave as if they have access to a large, single storage entity, referred to herein as a computer system memory, instead of access to multiple, smaller storage entities such as the main memory 806 and data storage device 816. Note that the term "computer system memory" is used herein to generically refer to the entire virtual memory of the information processing system 800.

Although only one CPU 804 is illustrated for computer 802, computer systems with multiple CPUs can be used equally effectively. Embodiments of the present invention further incorporate interfaces that each includes separate, fully programmed microprocessors that are used to off-load processing from the CPU 804. Terminal interface 810 is used to directly connect one or more terminals 820 to computer 802 to provide a user interface to the computer 802. These terminals 820, which are able to be non-intelligent or fully programmable workstations, are used to allow system administrators and users to communicate with the information processing system 800. The terminal 820 is also able to consist of user interface and peripheral devices that are connected to computer 802 and controlled by terminal interface hardware included in the terminal OF 810 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Various embodiments of the present invention are able to use any other suitable operating system. Some embodiments of the present invention utilize architectures, such as an object oriented framework mechanism, that allows instructions of the components of operating system (not shown) to be executed on any processor located within the information processing system 800. The network adapter hardware 812 is used to provide an interface to a network 822. Embodiments of the present invention are able to be adapted to work with any data communications connections including present day analog and/or digital techniques or via a future networking mechanism.

Although the various embodiments of the present invention are described in the context of a fully functional computer system, those skilled in the art will appreciate that embodiments are capable of being distributed as a program product via CD or DVD, e.g. CD 818, CD ROM, or other form of computer readable storage media, or via any type of electronic transmission mechanism.

Example of a Neutron Detector

Figure 9:
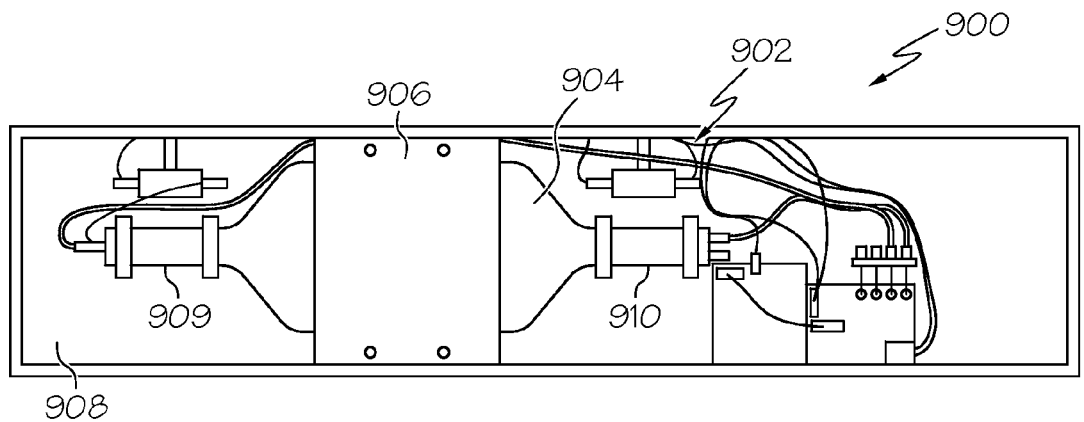
FIG. 9 is a an image showing an example of a gamma and/or neutron detector according to one embodiment of the present invention.
Figure 10:
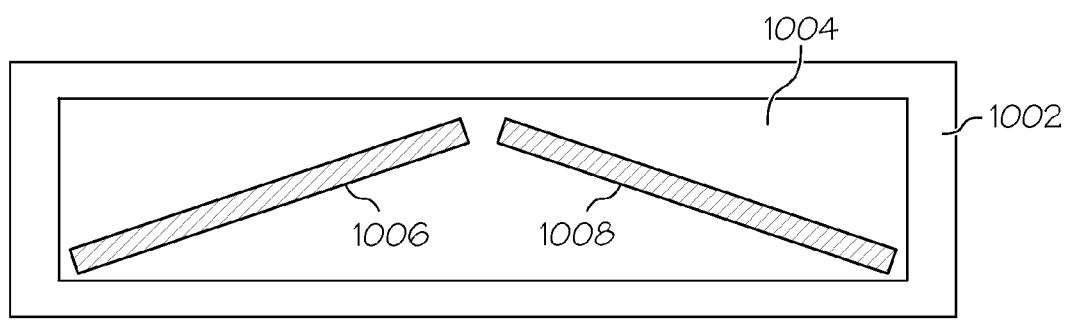
FIGS. 10, 11, and 12, are diagrams showing alternative configurations of detectors, according to various embodiments of the invention.

FIGS. 9 and 10 show one example of a neutron detector 900 with a side of a detector box removed to show the detector components inside. In this example, the detector 900 is enclosed in a detector box with two detector components 1006, 1008, (also shown in FIG. 9 as a combined detector structure 904), with one detector component 1006 going one way, and the other detector component 1008 going the other way in a V-shape, as shown in FIG. 10. Each detector component 1006, 1008, in this example, is optically coupled with a respective photomultiplier tube 909, 910. Each detector component, while not shown in FIGS. 9 and 10, includes one or more layers of detector element and optionally one or more layers of moderator all combined into a sandwich structure. Additionally, a box of moderator material 1002 encloses the two detector components 1006, 1008, and is located inside the outer detector box. This moderator box 1002 includes moderator material on all sides 906, 908, 902, surrounding the detector assembly 1004 comprising the two detector components 1006, 1008. This moderator box configuration (surrounding the one or more detector components) enhances the detection of incident neutrons by the one or more detector components in the moderator box 1002. Also shown in FIG. 9 are the detector electronics and other supporting components of the detector 900. There is something remarkable about having a moderator box 1002 around the detector. What happens is that the moderator box 1002 appears to give a larger face to the detection area. A neutron typically has to be moderated before it can be detected by a thermal neutron detector, and when it goes through that moderator material in the moderator box 1002, the neutron will bounce around in all directions inside the moderator box 1002. This increases the likelihood that the neutron will impact the scintillation material in the one or more detector components 1006, 1008.

While a detector element may be relatively small, like in a helium 3 device, which normally can have a small helium 3 tube and the tube is only 2 inches, the moderator box 1002 may be 10 inches. So the detector has a 10 inch collection face feeding neutrons into the smaller detector inside the moderator box 1002. The outside moderator box provides a larger initial front face to the world for collection of incident neutrons that could be absorbed by the one or more neutron detector components 1006, 1008, as the neutron is reflected inside the cavity of the moderator box 1002. This moderator box 1002 is particularly useful for slowing down (thermalizing) fast neutrons. However, even thermal neutrons could be further thermalized by the moderator box 1002 for better detection by the one or more neutron detector components 1006, 1008.

FIG. 10 illustrates the detectors 1006, 1008, configured in angles within the moderator box 1002 to create an optimum efficiency. Here the moderator box 1002 encloses the full detector assembly 1004. The detector elements 1006, 1008, are placed at angles to form a V shape arrangement within the cavity of the moderator box 1002. The angled detectors 1006, 1008, within the moderator box 1002 allows for greater interaction with the neutrons.

Alternative Configurations of Detectors

Figure 11:
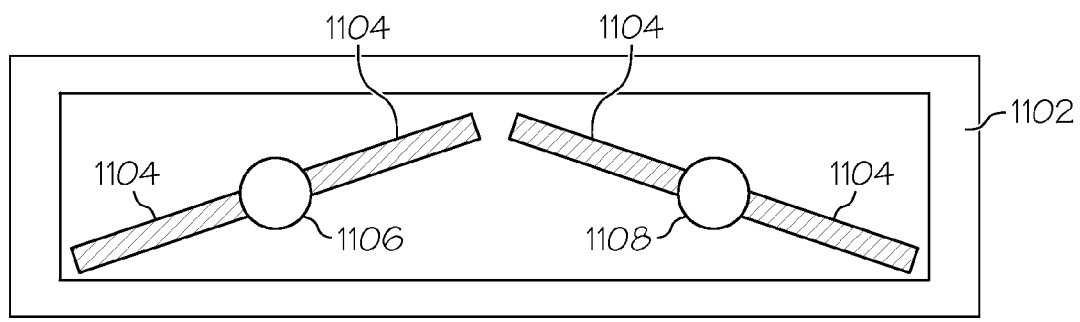
Figure 12:
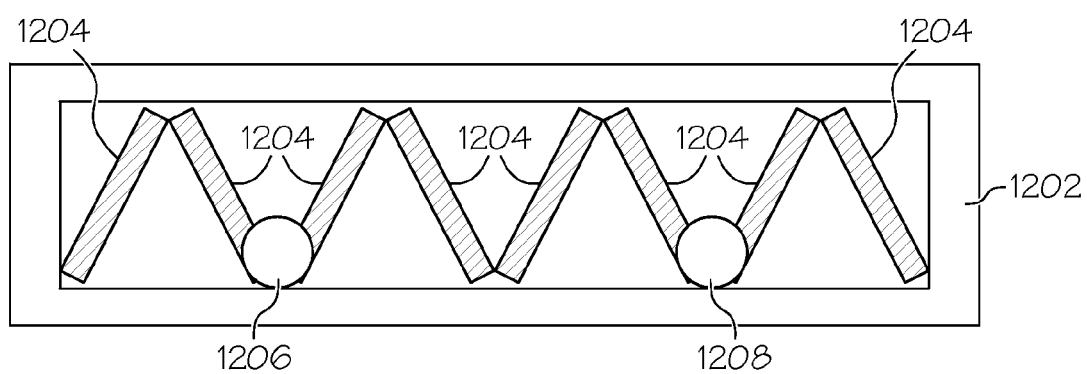

FIGS. 10, 11, and 12, provide a gain in peripheral detection of neutron collisions. These three figures show detectors in a moderator box from a top down view inside the moderator box. FIGS. 11 and 12 also show photosensors optically coupled with the detectors inside the moderator box. For example, FIG. 11 provides a plurality of detectors 1104 arranged generally in a V-shape inside the moderator housing 1102, similar to that shown in FIG. 10. However, two detectors of the plurality of detectors 1104 are optically coupled with respective each of two photosensors 1106, 1108. This arrangement, and additionally combined with other detector element configurations discussed herein, helps increase the gain in detection of neutron collisions for the detectors 1104 inside the moderator box 1102. FIG. 12 shows a corrugated arrangement of a plurality of detectors 1204, with four detectors optically coupled with respective each of two photosensors 1206, 1208. This corrugated arrangement, and additionally combined with other detector element configurations discussed herein, helps further increase the gain in detection of neutron collisions for the detectors 1204 inside the moderator box 1202.

Alternative Arrangements of Optical Fiber Media and Detector Layers

Figure 13:
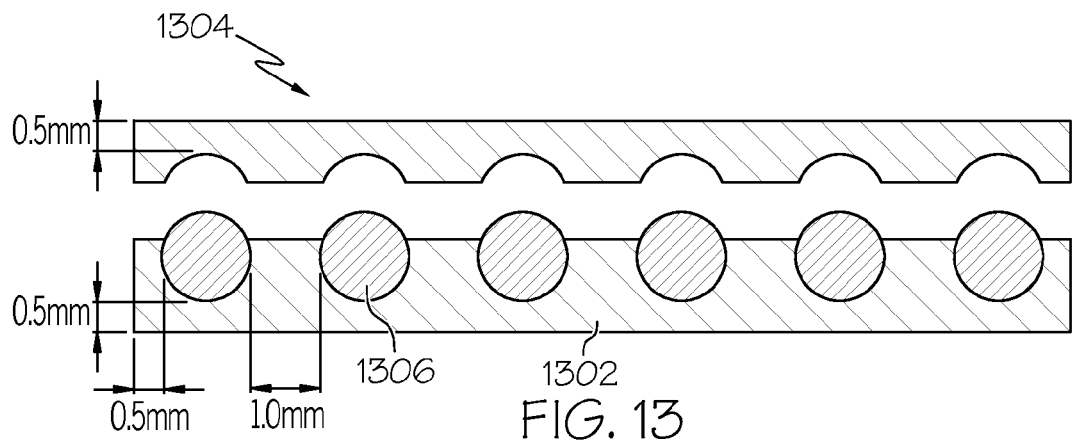
FIGS. 13, 14, and 15, are diagrams illustrating various examples of optical fiber media with scintillation detector layers in modular arrangements, according to various embodiments of the invention.
Figure 14:
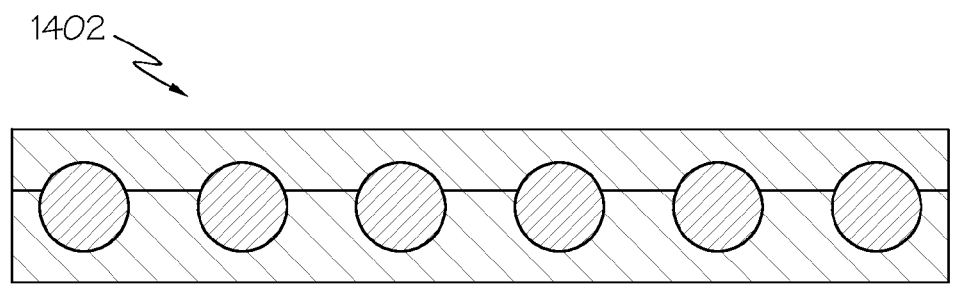
Figure 15:
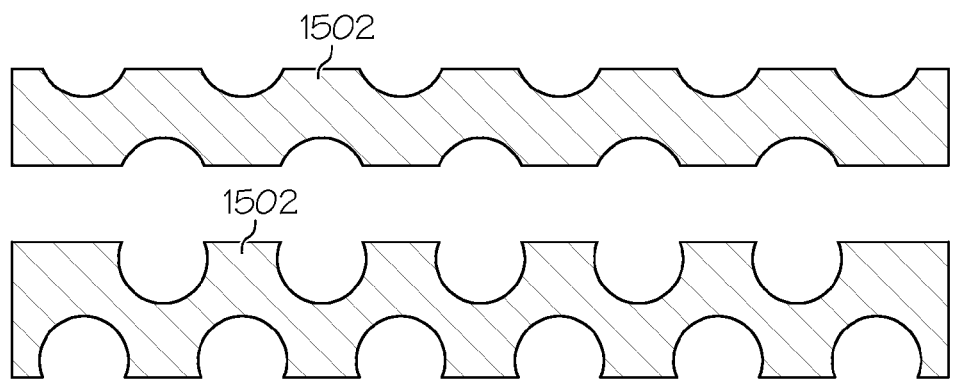

FIGS. 13, 14, and 15 illustrate optical fibers in various arrangements embedded in scintillation material utilizing a modular approach for fabrication of one or more detectors. As shown in FIG. 13, according to one embodiment, a scintillation layer is arranged as a module with a bottom piece 1302 and a top piece 1304 that are located adjacent to, and optionally abutting, each other to form one layer of a detector. Each piece 1302, 1304, has peaks and valleys formed to match peaks and valleys of the other piece 1302, 1304. Where two valleys are located adjacent to each other a space is formed to hold an optical fiber 1306 in the scintillation layer module. Each of the optical fibers 1306 is located inside the scintillation layer module to be a specific distance away from the scintillation material separating the optical fibers 1306. This distance is selected to enhance the transfer of light photons from the scintillation material into the optical fibers 1306. That is, for example, when a neutron collides with the lithium 6 (Li6) material in the scintillation layer an alpha particle or a triton particle is generated and it collides with phosphor material in the scintillation material. The collision of the alpha particle or triton particle with the phosphor material generates light photons. These light photons generated from the phosphor material normally can travel very limited distances. By locating optical fiber 1306 within this limited distance will enhance the number of photons of light that will be optically coupled into the optical fiber 1306. The scintillation module thereby provides an environment where there are many insertion points for light photons to transfer into adjacent optical fiber to enhance transfer of light photons from the scintillation material to one or more photosensors (not shown) located outside of the scintillation material. In the example shown in FIG. 13, the optical fibers 1306 are spaced approximately 1.0 millimeter apart.

Instead of drilling holes all the way through scintillation material blocks and dragging optical fibers through these holes, according to one embodiment of the present invention, one or more layers scintillation material are formed in two pieces 1302, 1304. A sheet of scintillation material of a specific thickness is created thin enough so that optical fiber will "see" (receive the light photons from) the light reaction in the scintillation material from neutron particle collisions with the scintillation material.

The optical fiber could be shaped in any type of circumference, such as a square or round circumference. In this particular example, as shown in FIGS. 13 and 14, a round shape circumference was selected for the fibers 1306. The round shape of the optical fibers 1306 also facilitates coupling light photons from the scintillation material, which could be in one or more scintillation layers located above and below the optical fibers 1306. That is, as shown in FIG. 14, multiple layers 1402 of the scintillation material with optical fibers can be located on top of each other to create a multi-layer detector. The dimensions of each layer and the optical fibers are selected to give optimum position of the optical fibers 1306 completely surrounded by the scintillating material but only of a specific thickness and distance, as shown in FIG. 13. Additionally, the optical fibers can optionally be wavelength shifting fibers 1306.

When making a detector block, or a detector having multiple detector layers, a manufacturing process uses a mold to form the paired bottom and top pieces 1302, 1304. The bottom piece 1302 at the valleys creates groves in the scintillation block where the optical fibers are located in. Then, the top piece 1304 is placed on top of the bottom piece 1302 with the optical fibers captured in the two pieces 1302, 1304. Additionally, an adhesive coated on the fibers will keep them in place so that they mate up well with the scintillation block pieces 1302, 1304. When located adjacent to, and optionally abutting, each other, the top and bottom pieces 1302, 1304, and the optical fibers 1306 sitting in the middle, form an extremely tight and seamless encasement of the optical fibers 1306. Optionally, the fibers are wave length shifting fibers 1306. These wavelength shifting fibers 1306, according to one embodiment, can be located equidistant all around with respect to the thickness of the phosphorous material. In FIG. 14, the scintillation layer block 1402 is shown totally assembled with the bottom 1302 and top 1304 pieces encasing the wavelength shifting fibers 1306. The length of this block 1402 can be selected for particular applications. Also, although the scintillation layer block 1402 is shown in a straight length of rectangular shape, it should be noted that other curved lengths and other cross-sectional shapes are anticipated by various embodiments of the present invention. For example, a curved length of the scintillation layer block 1402 could be used to detect neutron collisions in particular applications.

In FIG. 15, an alternative arrangement is shown that staggers optical fibers within layers of scintillation material. FIG. 14 shows one layer of scintillation material with optical fibers. However, to make a multi-layer scintillation material block, according to one embodiment, wavelength shifting fibers can be staggered from layer to layer. That is, when top and bottom pieces 1502 of one layer are adjacent to each other with optical fibers captured in the grooves between the two pieces 1502, a second layer can then be stacked on top such that the distance is reduced between fibers in adjacent layers, thereby enhancing the transfer of light photons from the scintillation material in one layer to fibers in adjacent layers. After a desired number of layers are stacked using the pieces 1502 shown n FIG. 15, the final top and bottom pieces 1304 and 1302, such as shown in FIG. 13, could be used to complete the multi-layer scintillation block—with flat surface on the top and on the bottom of the resulting multi-layer block.

In FIG. 15, the arrangement of fiber on a top layer, for example, may actually pick up a light photon generated from a neutron collision with the scintillation material that might normally be part of a lower layer. Fibers on adjacent layers are all equal distance for the specific distance for the light photons to travel and be optically coupled to the adjacent fibers in the adjacent layers. This enhances the likelihood of picking up the light in a multi-layered detector versus the single layer shown in FIG. 14. This modular single-layer or multi-layer detector optionally could have moderator material placed above and/or below or in between the layers, according to various embodiments of the present invention. For example, a certain application could stack two scintillation detector layers and then stack these on top of a moderator layer. As a second example, a scintillation detector layer could be located on top of a moderator layer that is located on top of another scintillation detector layer, in a sandwich design. This modular approach to making scintillation detectors, or scintillation detector layers, is very flexible and particularly adaptable in mass manufacturing process.

Neutron Particle Collision Pattern and Alternative Detector Configurations

Figure 16:
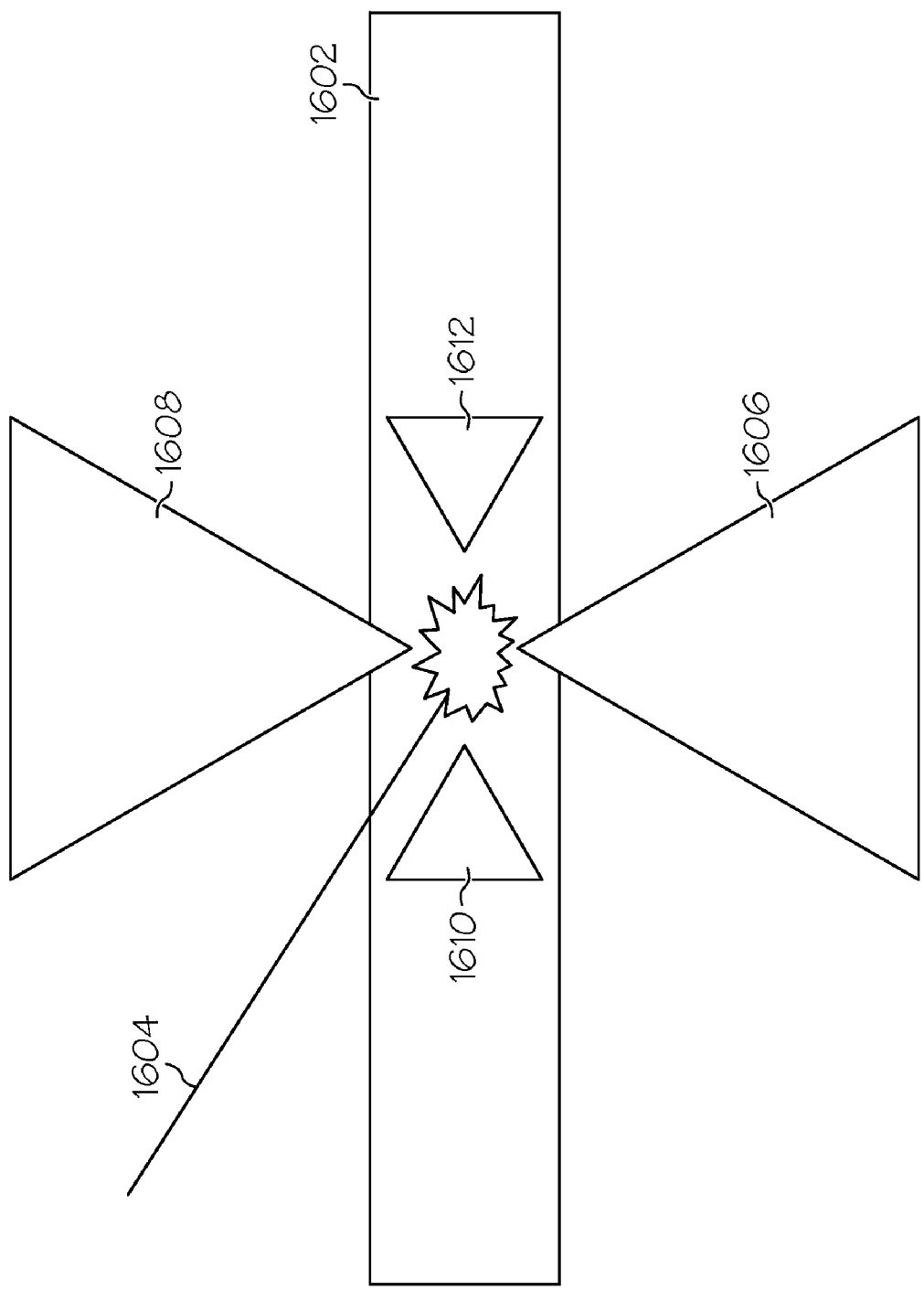
FIG. 16 is a block diagram illustrating an example of a pattern of a neutron particle collision in moderator material.

FIG. 16 shows an example of a neutron particle collision pattern. When a traveling neutron particle 1604 collides with a layer of moderato material 1602, reflection and scattering of the thermalized neutron particle occurs. When the incident neutron particle 1604 collides, the inventor has determined that approximately 35% of the time the thermalized neutron particle continues along a path from the longer dimension of the moderator layer 1602 such as shown by paths 1606, 1608. Approximately 10% of the time the thermalized neutron particle continues along a path from the shorter dimension of the moderator layer 1602 such as shown by paths 1610, 1612.

Figure 17:
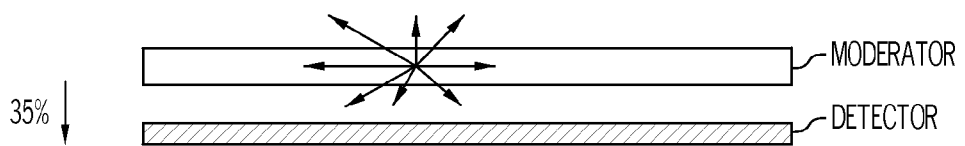
FIGS. 17, 18, 19, and 20, are diagrams illustrating various examples of patterns of neutron particle collisions in moderator material adjacent with one or more detector layers, according to various embodiments of the invention.
Figure 18:
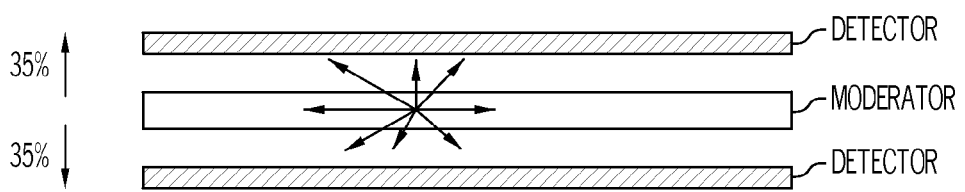

FIGS. 17, 18, 19, and 20, illustrate various arrangements of one or more detectors and one or more moderators. As shown in FIG. 17, moderator is located adjacent to, and in front of, a detector. An incident neutron particle collides with the moderator and approximately 35% of the time the thermalized neutron particle continues to the detector. As shown in FIG. 18, a moderator is located between an upper detector and a lower detector. An incident neutron particle, that passes through the upper detector and collides with the moderator, will approximately 35% be thermalized and continue to the lower detector while approximately 35% of the time the thermalized neutron particle continues to the upper detector. Therefore, there is a 70% likelihood that the thermalized neutron particle will be detected by one of the two detectors.

Figure 19:
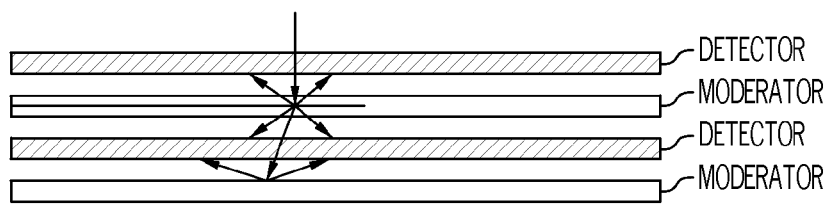

FIG. 19, as compared to the example of FIG. 18, adds one more moderator below the lower detector. This added moderator then allows approximately 35% of the time a reflection of a thermalized neutron (that may have passed through the lower detector) back into the lower detector where the further thermalized neutron may be detected by the lower detector.

It should be noted that approximately 20% of the time a thermalized neutron may continue along a path from either the left (10%) or the right (10%) shorter dimension of the moderator layer. This neutron may pass undetected by either detector.

Figure 20:
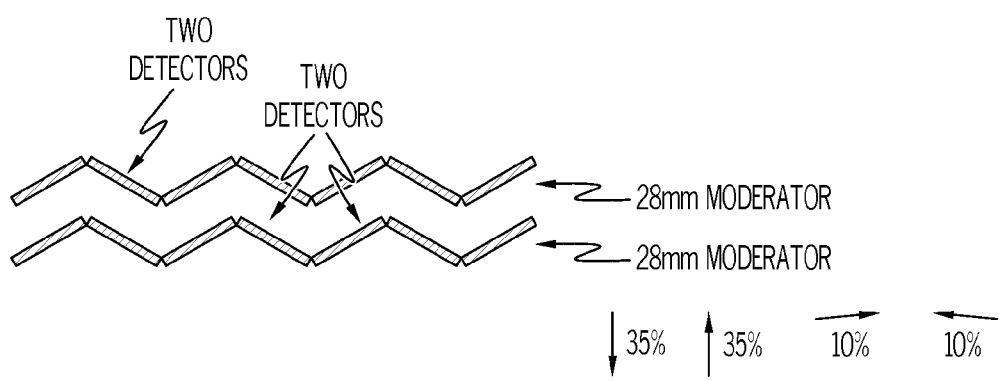

The inventor has found that a corrugated detector arrangement such as shown in FIG. 20 will increase the likelihood that a thermalized neutron particle will be detected by at least one of the two or more corrugated detectors. As shown in the example of FIG. 20, a moderator of approximately 20 millimeter thickness is located between the two corrugated detectors and another moderator of approximately 20 millimeter thickness is located below the lower corrugated detector.

FIG. 20 shows corrugated detectors in an arrangement with spatially distributed detectors. By locating more detector surface area in the same linear space the corrugated arrangement, for example, could create approximately 10 inches of detector in what would normally be a 5 inch straight space. It can yield better detection of incident neutrons, particularly from the peripheral view of left and right.

It should be noted that a detector layer is typically limited in thickness because as the thickness increases light photons that are generated by an alpha particle or triton particle colliding with phosphor material in the detector layer can be picked up by wavelength shifting optical fiber within a limited distance (to then deliver the light photon to the photomultiplier tube). That is, in a thicker layer the light photons will be self-absorbed into the detector layer before they can be transferred to the optical fibers. Because the light doesn't travel far in the detector layer, it has to be a very thin layer to transfer light into the optical fibers.

Figure 25:
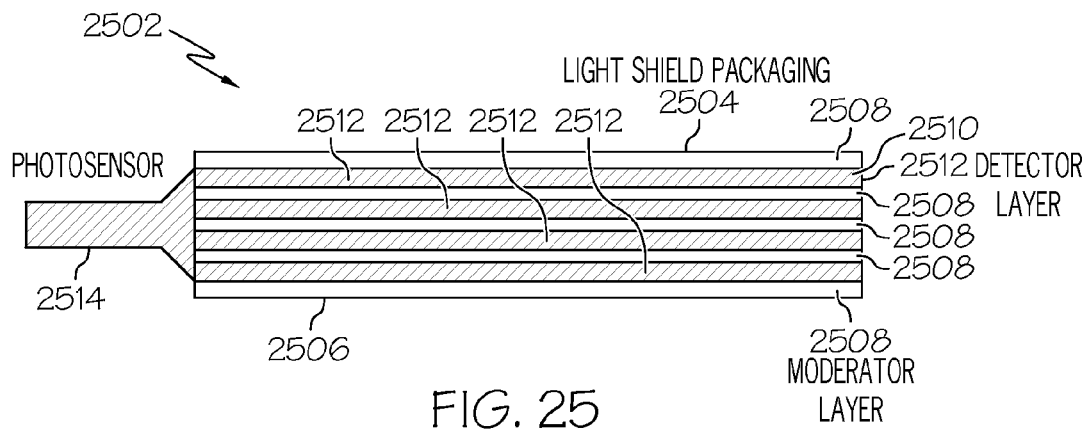
FIG. 25 illustrates one example of a neutron detector comprising four detector layers interposed with layers of moderator material, and being optically coupled to a photosensor; according to one embodiment of the present invention.

Therefore, to increase detector efficiency, a plurality of detector layers can be used in a detector. For example, FIG. 25 shows an example of a four layer detector 2502. That is, there is a first layer of detector material and wave length shifting fibers, a second layer of detector material and wave length shifting fibers, a third detector layer and wave length shifting fibers, and then a fourth layer of detector material and wave length shifting fibers. According to various embodiments of the present invention, different arrangements of detector material and moderator material are proposed to significantly increase overall detector efficiency.

Figure 21:
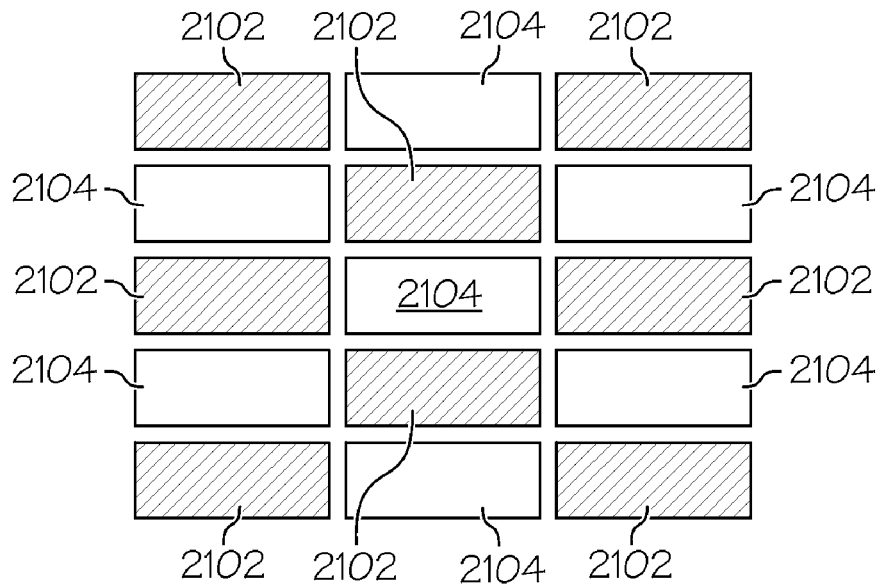
FIG. 21 is a block diagram illustrating neutron detector elements interposed with moderator material in a spatial distribution arrangement according to one embodiment of the present invention.

Various Arrangements of Neutron Detector Layers, Neutron Detectors, and Moderator, and Optional Spatial Distribution Arrangements In FIG. 21, detector layers 2102 are interposed with moderators 2104 (e.g., made with hydrogenous materials) in a spatially distributed configuration to increase overall thermal neutron sensitivity. By spatially distributing the detector layers 2102 with the moderators 2104 as shown, more neutrons will be detected by the overall detector structure shown in FIG. 21. Note that the hydrogenous materials may be exchanged with non-hydrogenous materials to enable spatial distribution. This spatial distribution approach will enhance the likelihood of neutron particles being detected by at least one detector layer 2102.

Figure 22:
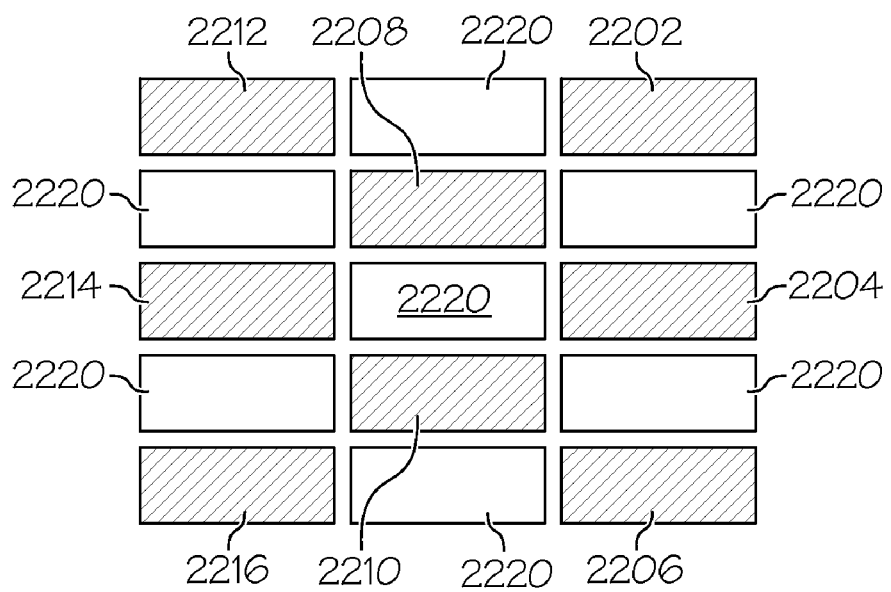
FIG. 22 is a block diagram illustrating neutron detectors interposed with moderator material in a spatial distribution arrangement according to one embodiment of the present invention.

FIG. 22 shows spatially distributed detectors 2202, 2204, 2206, 2208, 2210, 2212, 2214, and 2216, with moderator materials 2220 interposed between the detectors. Each detector, for example see the detector 2202 in the upper right corner of the overall structure, may include further spatial distribution of detector layers and moderator layers such as shown in FIG. 21. This spatial distribution approach will maximize the likelihood of neutron particles being detected by at least one detector.

Figure 23:
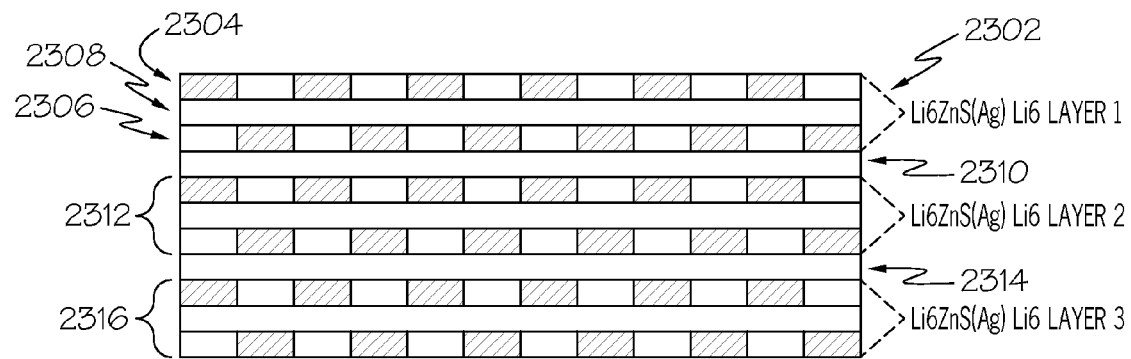
FIG. 23 is a block diagram illustrating neutron detector layers with neutron detector elements interposed with moderator material in a spatial distribution arrangement, and the neutron detector layers being interposed with moderator layers, according to one embodiment of the present invention.

FIG. 23 shows an example of combining layers of detectors with spatial distribution techniques to significantly increase the efficiency of detection of neutron particles by at least one detector. As shown in FIG. 23, each detector layer 2302 is spatially distributed by separating the layer of detector material 2302 into two layers 2304, 2306, with moderator material interposed horizontally between detector elements. A layer of moderator material 2308 is also interposed between the two detector layers 2304, 2306.

FIG. 23 also shows three of these detectors 2302, 2312, and 2316, with moderator material 2310, 2314, interposed between layers of detectors 2312, 2316. Neutron efficiency is increased. Neutrons that travel into the overall structure shown in FIG. 23 may enter one of the detector layers 2302 and the neutron particle are either detected by a detector element in that layer 2302 or pass through the detector element. When the neutron particle passes through a first detector element the neutron particle may collide with adjacent moderator material and be further thermalized. Then, the thermalized neutron particle may be detected by another detector element in that layer 2302 or by a detector element in a next detector layer 2312, 2316. Also, a neutron particle may bounce around in the adjacent moderator and may be sent back into the first detector element to be detected. By further thermalizing an incident neutron a thermal neutron will likely be detected by one of the detector elements in a detector layer 2302, 2312, 2316. Also, traveling neutrons are caused to ricochet all over the detector structure shown in FIG. 23, and possibly a thermalized neutron will re-enter the detector they just went through and go back through it again. This gives a higher probability of detection by making the thermalized neutrons pass through the detector layers 2302, 2312, 2316, multiple times after ricocheting in adjacent moderator material.

This detector structure shown in FIG. 23 significantly increases neutron detection efficiency while not increasing gamma interference (cross-talk) because this overall structure separates detector material into detector elements with adjacent moderator material without adding more detector material than would be used in a single detector layer such as shown in FIGS. 17 to 19. The total amount of detector material used in a detector has a direct relationship with the amount of gamma particle interaction that could cause gamma interference while attempting to detect neutron particles. Also, this detector structure shown in FIG. 23 causes the neutrons to go back through the detector material multiple times and re-use the neutron particle to capture more light detection. This increases neutron detection efficiency while not increasing gamma detection efficiency because the configuration does not add more detector material. It is the scintillation material that may be scintillated by either neutron particle impacts or by gamma particle impacts in the scintillation material. Further, this spatial distribution of detector elements with moderator material may lower gamma detection, which is highly desirable, because a traveling gamma particle may be absorbed into the moderator material. Additionally, various embodiment of the present invention utilize a novel gamma filtering system, including fast digital electronics and digital processing techniques, to filter out all gamma cross-talk from neutron detection. This overcomes the problems with the prior art of using analog electronics and slow analog signal processing techniques that are not effective to filter out gamma signal interference. A detector according to one embodiment of the present invention can clearly see the different signals from neutron collisions and from gamma collisions in the detector. It uses fast electronics and digital signal processing environment to do reliable digital pulse shape analysis. The novel detector device arrangements in combination with novel electronic circuits and digital signal processing, as have been discussed above, makes a neutron detector reliable and usable in many applications because now the neutron detector can filter out all gamma cross-talk.

It should be noted that the added moderator layer 2308, 2310, 2314, as shown in FIG. 23, enhances spatial distribution with all detector elements being separated by moderator material, as compared to FIG. 21. In FIG. 21, note that the corners of detector elements 2102 are adjacent to each other without separation by moderator material. On the other hand, in FIG. 23 all detector elements are separated by moderator material.

Various embodiments may combine the spatial distribution of detectors approach, as shown in FIG. 23, with the angled inter-lacing of detectors and moderators as shown in FIGS. 10, 11, 12, and 20.

Figure 24:
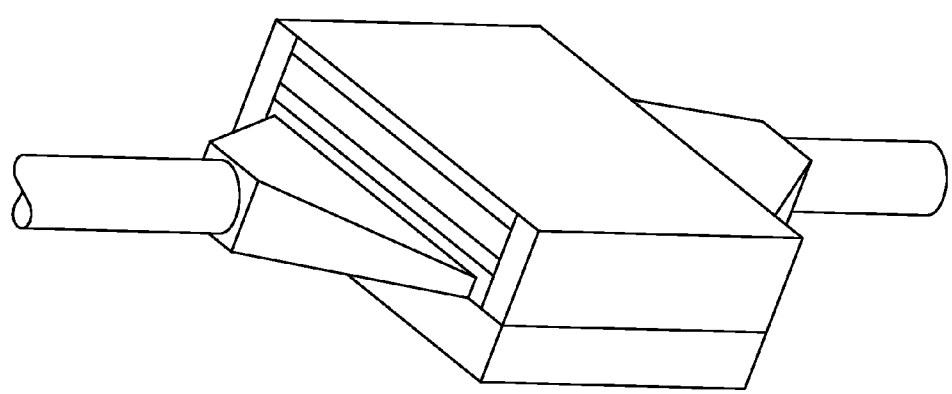
FIG. 24 shows one example of two detectors sandwiched together with moderator material layer separating the individual detectors, and each detector being optically coupled to a photosensor; according to one embodiment of the present invention.
Figure 26:
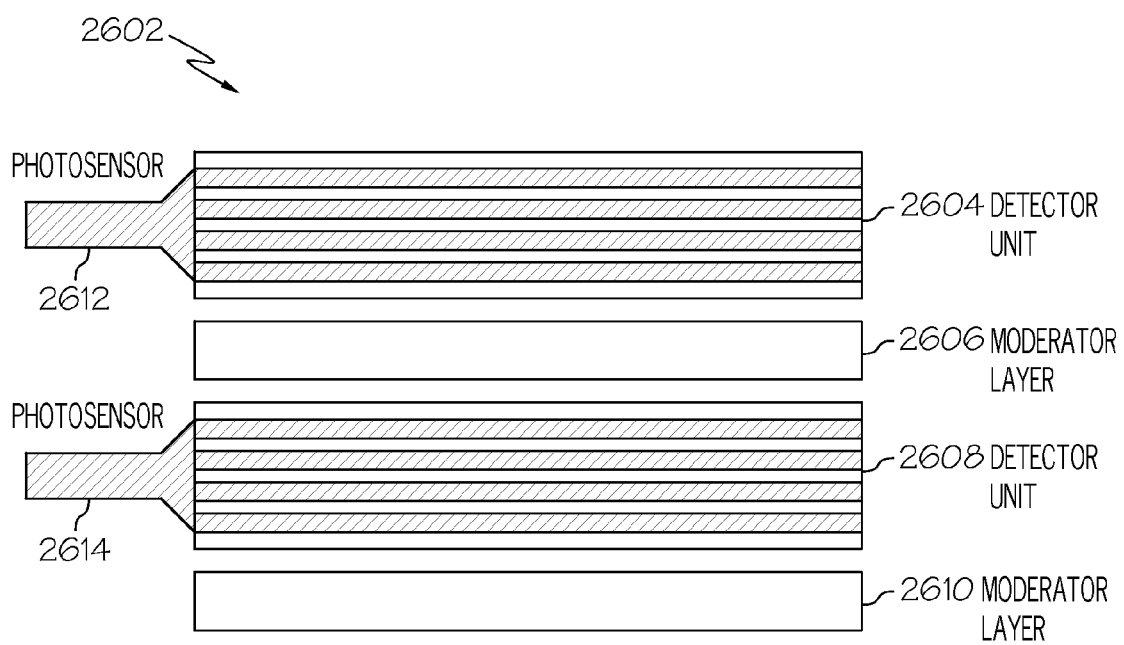
FIG. 26 shows one example of two neutron detectors sandwiched together, with each detector comprising four detector layers interposed with layers of moderator material, and being optically coupled to a photosensor, according to one embodiment of the present invention.

FIG. 24 illustrates a multiple detector structure with two photo-sensors 2612, 2614. See also FIG. 26 for an example of a four layer regular detector 2604 with moderator 2606 and a four layer regular detector 2608 with moderator 2610. Each four layer detector 2604, 2606, is optically coupled with a photo-sensor 2612, 2614. FIG. 24 also can represent a sandwich of one or more individual detectors all funneled into a single photo-sensor.

FIG. 25 shows a more detailed view of one detector 2502 with four detector layers 2512 being optically coupled with a photo-sensor 2514. The four detector layers 2512 are separated by moderator layers 2508. Additionally, a light shield material 2504 is located on top of the detector 2502 and a light shield material 2506 is located underneath the detector 2502. The light shield material 2504, 2506, enhances the detection of light from the scintillation material without interference from external light.

Example of Optical Coupling of Fibers with Photosensor

Figure 27A:
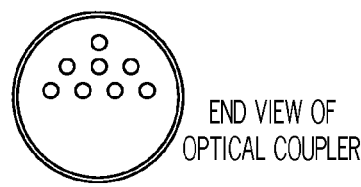
FIG. 27 is a block diagram showing one example of optically coupling optical fibers from neutron detector to a photosensor; in accordance with various embodiments of the present invention.
Figure 27B:
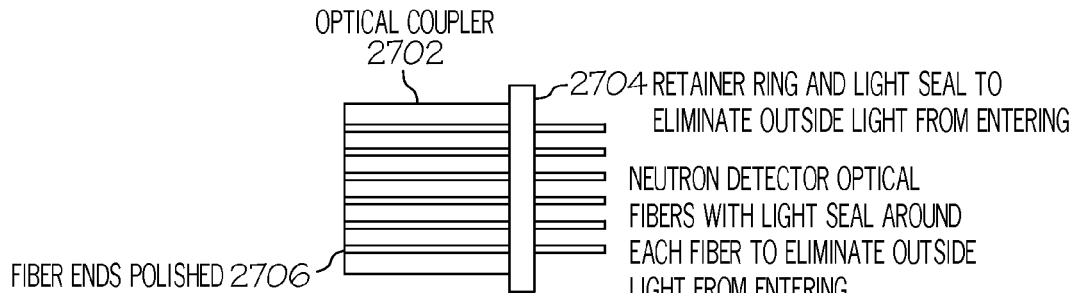
Figure 27C:
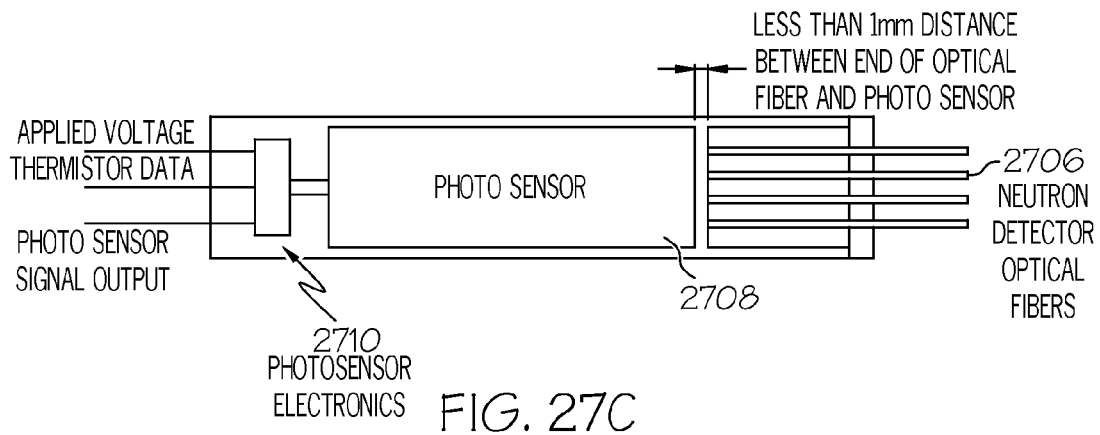

FIG. 27 illustrates a technical approach to optically couple optical fibers that deliver light photons from the scintillation material of one or more detectors to a photosensor, such as a photo-multiplier tube. An optical coupler 2702 and retaining ring 2704 retains the ends of a bundle of optical fibers 2706 so that the optical coupler can be plugged into a photosensor receptacle. The ends of the fibers 2706 are mechanically held adjacent to the photosensor optical input by the optical coupler 2702. The photosensor 2708 typically receives the light photons from the fibers 2706 and amplifies (e.g., multiplies) the optical signal and generates therefrom an electrical signal that is electrically coupled via photosensor electronics 2710 as an output electrical signal representing the light input detected by the photosensor.

Alternative Configuration of Detectors Around a Moderator Block

Figure 28:
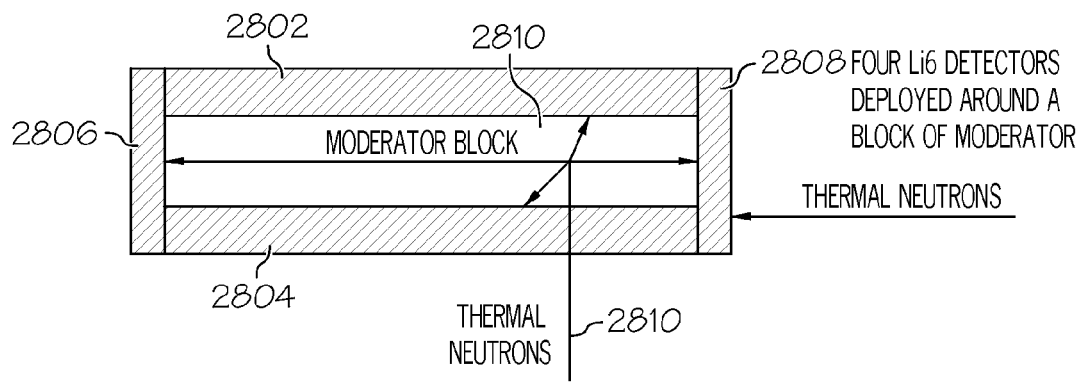
FIG. 28 is a block diagram illustrating four detectors deployed around a block of moderator material, according to one alternative embodiment of the present invention.

FIG. 28 shows four detectors 2802, 2804, 2806, 2808, located around a moderator block 2810, according to an alternative configuration of one or more detectors. As traveling fast neutron particles pass through one of the four detectors 2802, 2804, 2806, 2808, and enter the moderator block 2810, the neutron particles likely collide with material in the moderator block 2810. The collision causes a thermalized neutron particle to reflect or ricochet in one of various directions to then enter one or more of the four detectors 2802, 2804, 2806, 2808. In this way, the moderator block 2810 causes thermal neutrons to be detected by the detectors 2802, 2804, 2806, 2808.

Alternative Embodiment of Detector Using Solid-State Photomultiplier

Figure 29:
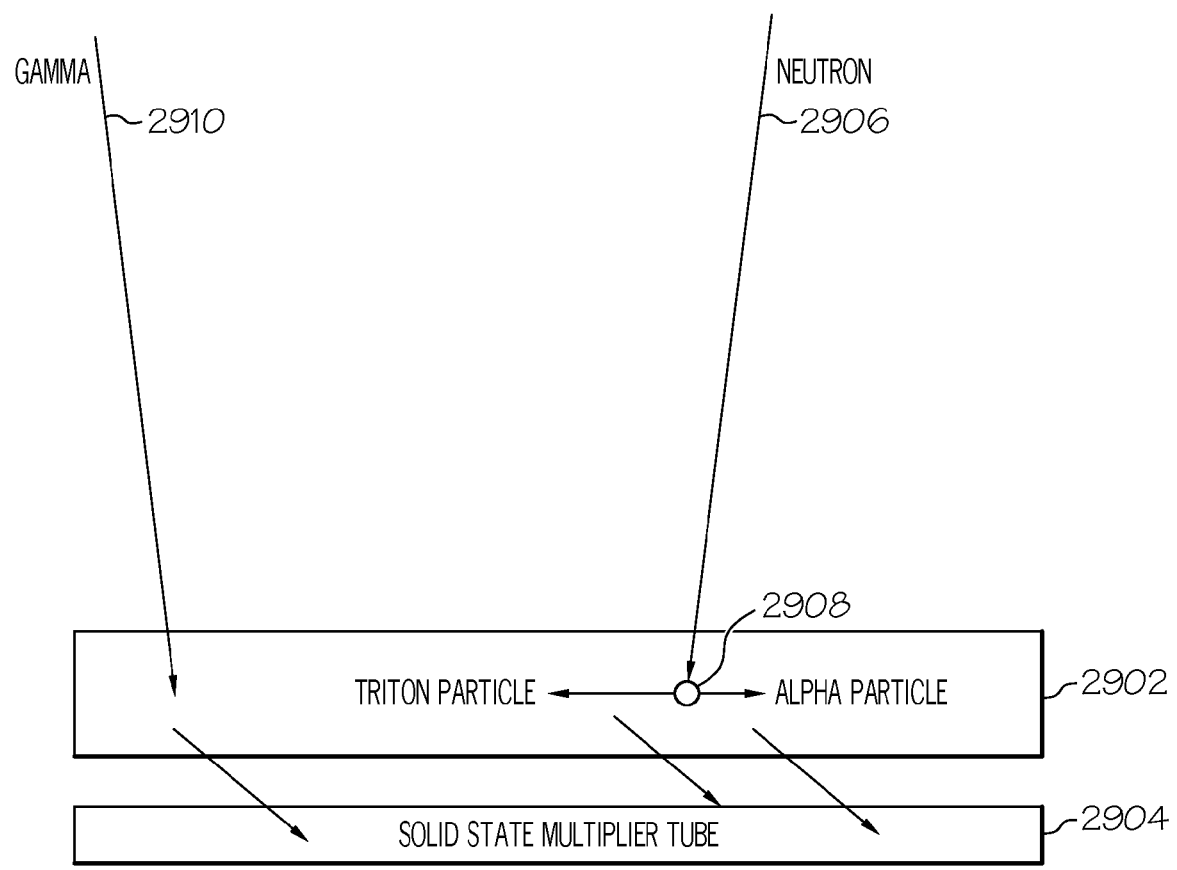
FIG. 29 is a block diagram showing a gamma and neutron detector optically coupled with a solid-state photomultiplier, according to an alternative embodiment of the present invention.

FIG. 29 shows an alternative embodiment using solid state photomultipliers as photosensors. A solid state photo-multiplier (SSPM) 2904, which may also be referred to as a solid state photo-multiplier tube (SSPMT), comprises an array of photo detecting elements that are arranged in a layer. The solid-state photomultiplier is a relatively new semiconductor based photodetector that possesses high gain and low noise while needing only low voltage to operate. The fast response and high gain of SSPMs makes them attractive for detector system applications according to various embodiments of the present invention.

The layer of photo detecting elements is located adjacent to, and optionally abutting, the scintillation material 2902. The array of photo detecting elements directly detect the light photons emitted from the scintillation material 2902 without using wave guide fibers in the detector (scintillation material) 2902 to pick up and deliver light photons to the photosensor. This simplifies a detector manufacturing process and reduces the overall manufacturing cost of the detector system. The speed and linearity of an SSPM, when coupled with a scintillator, provides a useful alternative to the previously discussed photosensors, such as photo-multiplier tubes, phototransistors, and photodiodes. A pixilated array of photo detecting elements are distributed across the entire face of the detector (scintillation material) and replace the wave length shifting fibers used in various embodiments discussed above. By dispensing with the use of fibers it removes material and processing costs in a manufacturing process, such as described with reference to FIGS. 13, 14, and 15. A square block of scintillation material, for example, can be placed adjacent to the pixilated array layer of the SSPM.

According to this alternative embodiment, a neutron particle 2906 travels into the scintillation material 2902 and collides 2908 with the scintillation material (e.g., with the lithium). This neutron collision 2908 in the scintillation material 2902 causes a triton particle or alpha particle to be generated which then activates nearby phosphor material in the scintillation material 2902. This activation of the phosphor generates light photons that are transmitted out of the scintillation material 2902 and into the SSPM 2904. The SSPM detects the light photons and generates an electronic signal that corresponds to the detected light photons. This electronic signal is amplified and delivered as an output electrical signal from the SSPM. It should be noted that gamma particles 2910 may also be detected by the scintillation material 2902 and thereby generate light photons into the SSPM 2904. The fast electronic circuits and digital processing, according to one embodiment of the present invention, can accurately distinguish detected gamma pulses from detected neutron pulses.

The scintillation material 2902 preferably comprises clear binder material that is light transmissive to allow the light photons to transfer out of the scintillation material 2902 with little to no attenuation. This clear binder approach may be used in any of the various embodiments of the present invention as have been discussed above to enhance the detection process.

Additionally, the scintillation material 2902, according to various embodiments, may comprise at least one of Li3PO4 and Li6ZnSAg. A phosphor material in the scintillation material 2902 converts collisions of incident neutron particles, that generate triton particles or gamma particles, to light photons. It should be noted that various embodiments that have been discussed above with reference to all of the present figures, may comprise at least one of Li3PO4 and Li6ZnSAg material, and may also include clear binder material in the scintillation material of the particular embodiment.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A scintillation neutron detector system, comprising:
    at least one neutron detector comprising at least one detector element comprising scintillation material;
    a photosensor having an optical input and an electrical signal output, the optical input being optically coupled to the scintillation material of the at least one detector element for coupling light photons emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;
    an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal;
    an analog to digital converter having an input electrically coupled to the output of the amplifier sensor circuit, and an output for providing a digital sensor signal corresponding to the electrical amplifier signal; and
    digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector, wherein the at least one neutron detector comprises a plurality of detector elements comprising scintillation material and that are arranged in a plurality of layers with moderator material interposed between individual detector elements of the plurality of detector elements.

2. The scintillation neutron detector system of claim 1, wherein the at least one neutron detector comprises a plurality of neutron detectors that are arranged in at least one of the following:
    a V-shape configuration; and
    a corrugated configuration.

3. The scintillation neutron detector system of claim 1, wherein the at least one neutron detector comprises a plurality of neutron detectors that are arranged to substantially surround a moderator block.

4. The scintillation neutron detector system of claim 1, wherein the optical input of the photosensor is optically coupled to the scintillation material of the at least one detector element by at least one light guide medium that optically couples light emitted from the scintillation material to the optical input of the photosensor.

5. The scintillation neutron detector system of claim 4, wherein the at least one light guide medium comprises wavelength shifting material coupled with light guide medium at the scintillation material, that optically couples light emitted from the scintillation material to the optical input of the photosensor.

6. The scintillation neutron detector system of claim 4, wherein the at least one light guide medium comprises wavelength shifting fibers that optically couple light emitted from the scintillation material to the optical input of the photosensor.

7. A scintillation neutron detector system, comprising:
    at least one neutron detector comprising at least one detector element comprising scintillation material;
    a photosensor having an optical input and an electrical signal output, the optical input being optically coupled to the scintillation material of the at least one detector element for coupling light photons emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;
    an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal;
    an analog to digital converter having an input electrically coupled to the output of the amplifier sensor circuit, and an output for providing a digital sensor signal corresponding to the electrical amplifier signal; and
    digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector, wherein the at least one neutron detector comprises a plurality of detector elements comprising scintillation material and that are spatially distributed with moderator material interposed between individual spatially distributed detector elements.

8. The scintillation neutron detector system of claim 7, wherein the plurality of detector elements comprising scintillation material are spatially distributed with moderator material interposed between individual spatially distributed detector element layers.

9. The scintillation neutron detector system of claim 7, wherein the plurality of detector elements comprising scintillation material are spatially distributed with moderator material interposed between individual spatially distributed detector elements arranged in at least one layer.

10. A scintillation neutron detector system, comprising:
at least one neutron detector comprising at least one detector element comprising scintillation material;
a photosensor having an optical input and an electrical signal output, the optical input being optically coupled to the scintillation material of the at least one detector element for coupling light photons emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;
an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal;
an analog to digital converter having an input electrically coupled to the output of the amplifier sensor circuit, and an output for providing a digital sensor signal corresponding to the electrical amplifier signal; and
digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector, wherein the at least one neutron detector comprises a plurality of neutron detectors that are spatially distributed with moderator material interposed between individual spatially distributed neutron detectors.

11. The scintillation neutron detector system of claim 10, wherein at least one neutron detector of the plurality of neutron detectors, comprises a plurality of detector elements comprising scintillation material and that are spatially distributed with moderator material interposed between individual spatially distributed detector elements.

12. A scintillation neutron detector system, comprising:
at least one neutron detector comprising at least one detector element comprising scintillation material;
a photosensor having an optical input and an electrical signal output, the optical input being optically coupled to the scintillation material of the at least one detector element for coupling light photons emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;
an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal;
an analog to digital converter having an input electrically coupled to the output of the amplifier sensor circuit, and an output for providing a digital sensor signal corresponding to the electrical amplifier signal; and
digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector, and further comprising:
a plurality of optical fibers surrounded by scintillation material and arranged in a plurality of layers with optical fibers in one layer being staggered arrangement relative to optical fibers of an adjacent layer, the plurality of optical fibers optically coupling the scintillation material to the optical input of the photosensor, for coupling the light photons emitted as one or more light pulses from the scintillation material to the optical input of the photosensor through the plurality of optical fibers.

13. A neutron detector system, comprising:
a plurality of neutron detectors, each detector comprising a plurality of spatially distributed detector elements interposed with moderator material, each detector element comprising scintillation material that includes any one or more of 6LiF, Li6, and Li3, and mixed with one or more phosphor materials in a binder medium, individual detectors of the plurality of neutron detectors being interposed with at least two inches thick of moderator material;
a plurality of wavelength shifting optical fibers distributed in the scintillation material to optimally receive and guide light photons emitted as one or more light pulses from the scintillation material;
a photosensor having an optical input and an electrical signal output, the optical input being optically coupled to the plurality of wavelength shifting optical fibers that guide light emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;
an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal; and
an analog to digital converter having an input electrically coupled to the output of the amplifier sensor circuit, and an output for providing a digital sensor signal corresponding to the electrical amplifier signal; and
digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector.

14. A neutron detector, comprising:

a plurality of detector elements interposed with moderator material, each detector element comprising scintillation material that includes any one or more of 6LiF, Li6, and Li3, and mixed with one or more phosphor materials in a binder medium, a pair of individual detector elements of the plurality of detector elements being interposed with moderator material from about 0.25 inches up to about 3 inches thick;

a plurality of wavelength shifting optical fibers distributed in the scintillation material to optimally receive and guide light photons emitted as one or more light pulses from the scintillation material;

a photosensor having an optical input and an electrical signal output, the optical input being optically coupled to the plurality of wavelength shifting optical fibers that guide light emitted as one or more light pulses from the scintillation material to the optical input of the photosensor, in response to neutron particles interacting with the scintillation material, and the electrical signal output providing an electrical sensor signal comprising one or more electrical pulses corresponding to the one or more light pulses from the scintillation material;

an amplifier sensor circuit having an amplifier signal input, that is electrically coupled to the electrical signal output of the photosensor, and an output, the amplifier sensor circuit being configured to provide at its output an electrical amplifier signal having an optimum electrical signal pulse shape for each of the one or more electrical pulses of the electrical sensor signal; and an analog to digital converter having an input electrically coupled to the output of the amplifier sensor circuit, and an output for providing a digital sensor signal corresponding to the electrical amplifier signal; and digital signal processing circuits, having an input electrically coupled to the output of the analog to digital converter, for performing pulse shape differentiation on the digital sensor signal based on one or more neutron signal shape filters and one or more gamma signal shape filters that are applied to the digital sensor signal to reduce, eliminate, or separate gamma pulse signal detection from neutron pulse signal detection by the at least one neutron detector.

* * * * *